(12) United States Patent
Romdhane

(10) Patent No.: US 9,047,413 B2
(45) Date of Patent: Jun. 2, 2015

(54) WHITE-BOX TESTING SYSTEMS AND/OR METHODS FOR USE IN CONNECTION WITH GRAPHICAL USER INTERFACES

(71) Applicant: Software AG, Darmstadt (DE)

(72) Inventor: Taoufik Romdhane, Saarbrücken (DE)

(73) Assignee: Software AG, Darmstadt (DE)

( * ) Notice: Subject to any disclaimer, the term of this patent is extended or adjusted under 35 U.S.C. 154(b) by 337 days.

(21) Appl. No.: 13/646,073

(22) Filed: Oct. 5, 2012

(65) Prior Publication Data

US 2014/0101640 A1   Apr. 10, 2014

(51) Int. Cl.
*G06F 9/44*       (2006.01)
*G06F 11/36*      (2006.01)

(52) U.S. Cl.
CPC ........ *G06F 11/3684* (2013.01); *G06F 11/3664* (2013.01); *G06F 11/3688* (2013.01)

(58) Field of Classification Search
CPC ............ G06F 11/3684; G06F 11/3688; G06F 11/3664
See application file for complete search history.

(56) References Cited

U.S. PATENT DOCUMENTS

| | | | | |
|---|---|---|---|---|
| 8,191,048 | B2 * | 5/2012 | Parthasarathy et al. | 717/126 |
| 8,522,211 | B2 * | 8/2013 | Arcese et al. | 717/124 |
| 8,595,703 | B2 * | 11/2013 | van Gogh et al. | 717/126 |
| 8,826,239 | B2 * | 9/2014 | Sawano | 717/126 |
| 8,924,938 | B2 * | 12/2014 | Chang et al. | 717/128 |
| 2007/0022407 | A1 * | 1/2007 | Givoni et al. | 717/124 |
| 2007/0143678 | A1 | 6/2007 | Feigenbaum | |
| 2010/0146420 | A1 | 6/2010 | Bharadwaj et al. | |
| 2010/0318970 | A1 * | 12/2010 | Grechanik et al. | 717/124 |
| 2011/0145653 | A1 * | 6/2011 | Broadfoot et al. | 714/38.1 |
| 2013/0311977 | A1 * | 11/2013 | Nieminen et al. | 717/135 |
| 2013/0339930 | A1 * | 12/2013 | Xu | 717/125 |

OTHER PUBLICATIONS

Chuang et al., User behavior augmented software testing for user-centered GUI, Nov. 2011, 9 pages.*
Yuan et al., Using GUI Run-Time State as Feedback to Generate Test Cases, May 2007, 10 pages.*
Vieira et al., Automation of GUI testing using a model-driven approach, May 2006, 6 pages.*

(Continued)

*Primary Examiner* — Thuy Dao
(74) *Attorney, Agent, or Firm* — Nixon & Vanderhye PC

(57) ABSTRACT

Certain example embodiments relate to white-box testing techniques, e.g., for graphical user interfaces (GUIs). A test case to be run on the application includes interactions between the application and external components that were gathered as the application ran and received user input from a user until a desired test state was reached, and assertions to be made to the application once that state is reached. A test environment replaces a normal environment in which the application runs. An adapter executes interactions on the test environment's GUI dedicated thread(s). The application is fed with interactions, through the adapter, until the application reaches the desired state. Once the application reaches that state, the application is fed with assertions. Expected data associated with the assertions is compared with data actually being generated by the application. A determination is made regarding whether the test case resulted in success or failure.

20 Claims, 21 Drawing Sheets

(56) References Cited

OTHER PUBLICATIONS

Svetoslav Ganov et al., "Barad—A GUI Testing Framework Based on Symbolic Execution," Laboratory of Experimental Software Engineering, University of Texas at Austin Software Testing and Verification Group [online] [retrieved Oct. 5, 2012] http://users.ece.utexas.edu/~perry/work/papers/080521-SG-barad.pdf.

UISpec4J: Java/Swing GUI Testing Made Simple! [online] [retrieved Oct. 5, 2012] http://www.uispec4j.org/.

Froglogic—Squish GUI Testing [online] [retrieved Oct. 5, 2012] http://www.froglogic.com/squish/gui-testing/.

Abbot Framework for Automated Testing of Java GUI Components and Programs, "Getting Started with the Abbot Java GUI Test Framework—Building Unit Tests and Functional Tests (AWTUnit/SwingUnit)" [online] [retrieved Oct. 5, 2012] http://abbot.sourceforge.net/doc/overview.shtml.

MAVERYX—The World's Most Innovative Java Testing Software [online] [retrieved Oct. 5, 2012] http://www.maveryx.com/.

BREDEX—GUIdancer/Jubula [online] [retrieved Oct. 5, 2012] http://www.bredex.de/web/index.php/guidancer_jubula_en.html.

Eclipse Jubula Project—Jubula Functional Testing Tool [online] [retrieved Oct. 5, 2012] http://eclipse.org/jubula/.

QFS Professional Test Automation: QF Test—The GUI Test Tool for Java and Web [online] [retrieved Oct. 5, 2012] http://www.qfs.de/en/qftest/index.html.

AOST—Tellurium Automated Testing Framework [online] [retrieved Oct. 5, 2012] http://code.google.com/p/aost/.

Wikipedia—List of GUI Testing Tools [online] [retrieved Oct. 5, 2012] http://en.wikipedia.org/wiki/List_of_GUI_testing_tools.

* cited by examiner

US 9,047,413 B2

WHITE-BOX TESTING SYSTEMS AND/OR METHODS FOR USE IN CONNECTION WITH GRAPHICAL USER INTERFACES

TECHNICAL FIELD

Certain example embodiments described herein relate to systems and/or methods for testing software applications and aspects thereof. More particularly, certain example embodiments relate to white-box testing techniques, e.g., for graphical user interfaces (GUIs). Certain example embodiments advantageously provide techniques that turn black-box GUI testing into white-box testing, while also potentially addressing problems typically encountered when GUIs are tested.

BACKGROUND AND SUMMARY OF EXAMPLE EMBODIMENTS OF THE INVENTION

White-Box Testing refers generally to a tester (e.g., the person writing/designing the test case, who sometimes is a developer) who has special knowledge about the implementation details of the test subject being able to leverage this knowledge to test the subject thoroughly. Compared to traditional black-box testing, where the tester only comes in contact with visible parts of the test subject, white-box testing sometimes enables the tester to test parts of the subject that may not be visible from the outside. Both white-box and black-box testing test visible and hidden parts of the software, but a difference is that the knowledge of the test subject internals may lead to better tests in white-box testing. Black-box testing may be more meaningful when used in integration tests, whereas white-box testing may be suitable for unit testing involving small, separate possible internal parts of the subject.

Current GUI testing tools and frameworks frequently rely on capturing user input (e.g., in form of mouse actions and/or keyboard input), optionally translating them into human readable or understandable actions, and replaying them at a later time, in order to execute the test case.

In contrast, white-box testing typically involves potentially widespread unit testing. In unit testing, modules or small component parts of a program can be separately and automatically tested. In this regard, tools such as JUnit, for example, are becoming an increasingly important part of software development.

The following table helps differentiate black-box and white-box testing techniques:

| Aspect | Black-Box Testing | White-Box Testing |
| --- | --- | --- |
| Application Knowledge | Only the functionality of the application is required (e.g., features as described in user manual). These tests are generally performed by testers. | The tester, usually a developer, generally needs to know the internal logic of the application (e.g., its program code) in order to perform unit testing. |
| Programming | Generally not required, although some testing frameworks offer automation support via some scripting or programming languages. | Generally required in connection with current techniques. |
| Applicability Level | Generally high level: In most cases, the tests simulate actual usage by persons operating the application to test. | Generally low level: White-box testing is mainly applicable on a low level as in unit testing, where each component/program entity is tested separately with knowledge of its internal logic/a detailed specification of its programming interface. |

There are a few commercially available programs for GUI testing, but they generally treat the GUI as a black box. In this vein, typical test frameworks mainly simulate user interaction by scripts, have means to read the screen and react on some events, and then verify a current state with an expected state. While some such frameworks and tools provide means for scripting or automating the tests with custom or standard programming languages, they generally do not provide access to data and classes of the target application domain. Thus, it is difficult and sometimes even impossible to implement custom test logic in the generated GUI test cases. But for white-box testing, the ability to implement custom test logic in the generated GUI test cases is taken as a given: If a test framework does not provide access to the application domain, it is impossible to do white-box testing and therefore impossible to even write custom test logic.

The reliability of information extraction also sometimes is a concern with current solutions. Standard GUI testing uses methods to read data from screen using generic component introspection at runtime, sometimes referred to as data scraping. These methods generally are thought to be more reliable than optical character recognition (OCR) because they deliver the exact character read from the screen, but they unfortunately leave room for interpretation errors (e.g., date parsing, Y2K problems, etc.). In some cases, displayed data may be truncated or transformed and therefore cannot be reliably used in tests. Although the read information may be available in its original and reliable form somewhere within the application model, it may nonetheless remain inaccessible for data scraping methods, thereby rendering these methods useless at least for cross checking results and so on.

Test cases in GUI testing usually include recorded interactions with the GUI and some checks to verify the test result(s). Because most of the test case logic includes recorded interactions, "generifying" these—which may involve building similar test cases that only differ in a few details (like checking a phone number instead of an email address)—may unfortunately require the user to record the interaction again and again for every detailed variation. Some frameworks offer the recorded interaction as a script that can be copied and modified, but it has been found that even these scripting capabilities still do not reach the flexibility and power of unit testing written in standard programming languages.

A main part of test cases generated with standard GUI testing tools includes data and information extracted from a program version that has been run with the testing tool. The information flow is unidirectional, from a running specific version of the program into a test case. Unfortunately, current tools do not provide a means for synchronizing this information, e.g., such as updating the test cases whenever relevant changes have been made to the program, or target of the test cases. This behavior reveals the lack of maintainability of such generated test cases. As a result, unit testing provides an advantage over black-box testing. Moreover, current GUI test cases usually use a proprietary data format or scripting language that, by nature, are not as widespread as standard programming languages like Java. This can also lead to poor maintainability, e.g., given the special knowledge needed in dealing with such proprietary features. In contrast, unit test cases can coexist with the program's code base and can be maintained side-by-side as the program code evolves during time, potentially in connection with a more widespread (and thus potentially more maintainable) programming language.

When a standard GUI testing tool is used, the test coverage is difficult or even impossible to assess automatically. There typically is no support for test coverage means of current Integrated Development Environment (IDEs). As an application evolves over time, assessing test coverage can become even more important (e.g., so that nothing is left untested) but also can be very difficult to assess without the help of dedicated tools (which are not supported in case of current GUI testing technologies). On the other hand, unit testing uses code coverage metrics efficiently because of the integration with the application code base. Moreover, in case of unit tests, it is even possible to assess the quality of the tests themselves using, for example, mutation testing. By contrast, it is highly improbable that such advanced techniques can be carried on normal GUI test cases.

Standard unit testing currently cannot be directly applied on GUI testing without the support of adapters and specialized frameworks. The more or less current standard unit testing tool, JUnit, is not appropriate for test cases dealing with GUI components. This is caused by two problems, namely, problems associated with building test cases and running them. With respect to the former, GUIs and GUI component oftentimes are more interesting to test in a way similar to integration tests, in that it oftentimes is desirable to test many components together in terms of interaction and as whole block. Unfortunately, it is very difficult to put components together so that they match the same constellation used in the application to test. With respect to running test cases, GUIs oftentimes run on a special thread dedicated to the user interface. Unit tests can be run on arbitrary threads but generally need to be adapted to run on the GUI thread. In case of Java and JUnit, for example, Java GUIs generally must be run on a special GUI thread, called the Event Dispatching Thread (EDT); otherwise, the results are undefined. JUnit does not currently provide any means to run test cases on the EDT. Therefore, a special test runner is needed, although such a tool is not yet commercially available.

Unit testing typically uses so called mock objects to simulate the behavior of the system parts that lie outside the scope of a test case. The mock objects may range from simulating the interaction with a simple class, to the communication with an external service like a database or the Internet. Mocking reduces the dependency on external systems and increases the reproducibility of certain cases subjected to tests. Both of these aspects are desirable in any kind of testing. However, in the case of standard GUI testing, the standard/established test framework can neither control the outside world, nor provide means to mock it. This makes standard GUI test cases something more akin to integration testing, mainly because of the dependence on the behavior of systems or program part not targeted by the test case.

Thus, it will be appreciated that there is a need in the art for white-box GUI testing techniques. For instance, it will be appreciated that it would be desirable to provide techniques that would, among other things, enable a developer to write unit tests for GUI parts and test them programmatically and extensively.

One aspect of certain example embodiments relates to supporting white-box GUI testing within a unit testing approach.

Another aspect of certain example embodiments relates to the introduction of an Event Dispatching Thread (EDT) adapter, which aids in the synchronization of GUI testing inside unit tests.

Another aspect of certain example embodiments relates to the inclusion of an interaction recorder in the application under test, which advantageously allows for the application to be run until a desired point, at which time custom test logic can be introduced.

Still another aspect of certain example embodiments relates to the integration of GUI testing into unit testing, advantageously allowing the IDE to produce statistics relevant to the use and correct functioning of GUI classes.

An advantage of certain example embodiments relates to the ability to provide automations for environment simulation and assertion sets.

Clear and well identified separation between the regular application and application under test is achieved using executable code injection in certain example embodiments.

In certain example embodiments, a method of testing an application in connection with a predefined test case is provided. The test case to be run on the application is retrieved. The test case includes (a) interactions between the application and components external to the test case's scope that were gathered as the application ran and received user input from a user until a desired test state was reached, and (b) assertions to be made to the application once the application reaches the desired test state. A test environment is set up in connection with a test runner. The test environment replaces a normal environment in which the application runs, and it includes an adapter configured to execute interactions on the test environment's GUI thread. The application is fed with interactions included in the test case, through the adapter, until the application reaches the desired test state. Once the application reaches the desired state, the application is fed with assertions included in the test case through the adapter. Expected data associated with the assertions is compared with data actually being generated by the application. It is determined, from the comparison, whether the test case resulted in a success or failure.

In certain example embodiments, a method of generating a test case for an application to be tested is provided. The application to be tested is started in an environment in which the application is normally run. Interactions between the application and components external to the test case's scope are stored, in connection with a recorder attached to the application, as the application runs and receives user input from a user. When a desired test state is reached: a determination is made as to which components of the environment are currently active; a determination is made, from a store including a plurality of different assertion sets, as to which of those assertions sets apply to the currently active components; corresponding component state data is fed to each said applicable assertion set to generate a corresponding assertion that holds current component state data; and the test case is generated, with the test case including the generated assertions and the stored interactions.

In certain example embodiments, a computer system for testing a computer application in connection with a predefined test case is provided. Processing resources include at least one processor and a memory. A non-transitory computer readable storage medium stores a plurality of test cases, with each said test case including (a) interactions between the application and components external to the test case's scope that were gathered as the application ran and received user input from a user until a desired test state was reached, and (b) assertions to be made to the application once the application reaches the desired test state. A test runner is configured to cooperate with the processing resources to set up a test environment in connection that replaces a normal environment in which the application runs. The test environment includes an adapter configured to execute interactions on the test environment's GUI thread. In connection with a selected one of said test cases, the adapter and/or test runner is/are configured to: feed the application with interactions included in the selected test case until the application reaches the desired test state; feed the application with assertions included in the selected test case once the application reaches the desired state; compare expected data associated with the assertions with data actually being generated by the application; and determine, from the comparison, whether the selected test case resulted in a success or failure.

In certain example embodiments, there is provided a non-transitory computer readable storage medium tangibly storing instructions that, when executed by at least one processor of a system, perform a method as described herein.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to white-box testing techniques, e.g., for graphical user interfaces (GUIs), and with support for unit testing. The framework of certain example embodiments allows an engineer to construct test cases built upon a running application by recording interactions, both from the user as well as from the communication layer (potentially on a API level). The framework may also allow integration with JUnit or other similar tool in certain example implementations, advantageously enabling a white-box GUI testing approach based on currently established and accepted unit testing methodology. Certain example embodiments advantageously provide features such as, for example, mocking, editable test cases, and editable test logic, thereby providing a full suite of tools for white-box testing. Certain example embodiments advantageously provide techniques that effectively turn black-box GUI testing into white-box testing, while also potentially addressing problems typically encountered when GUIs are tested.

Figure 1:
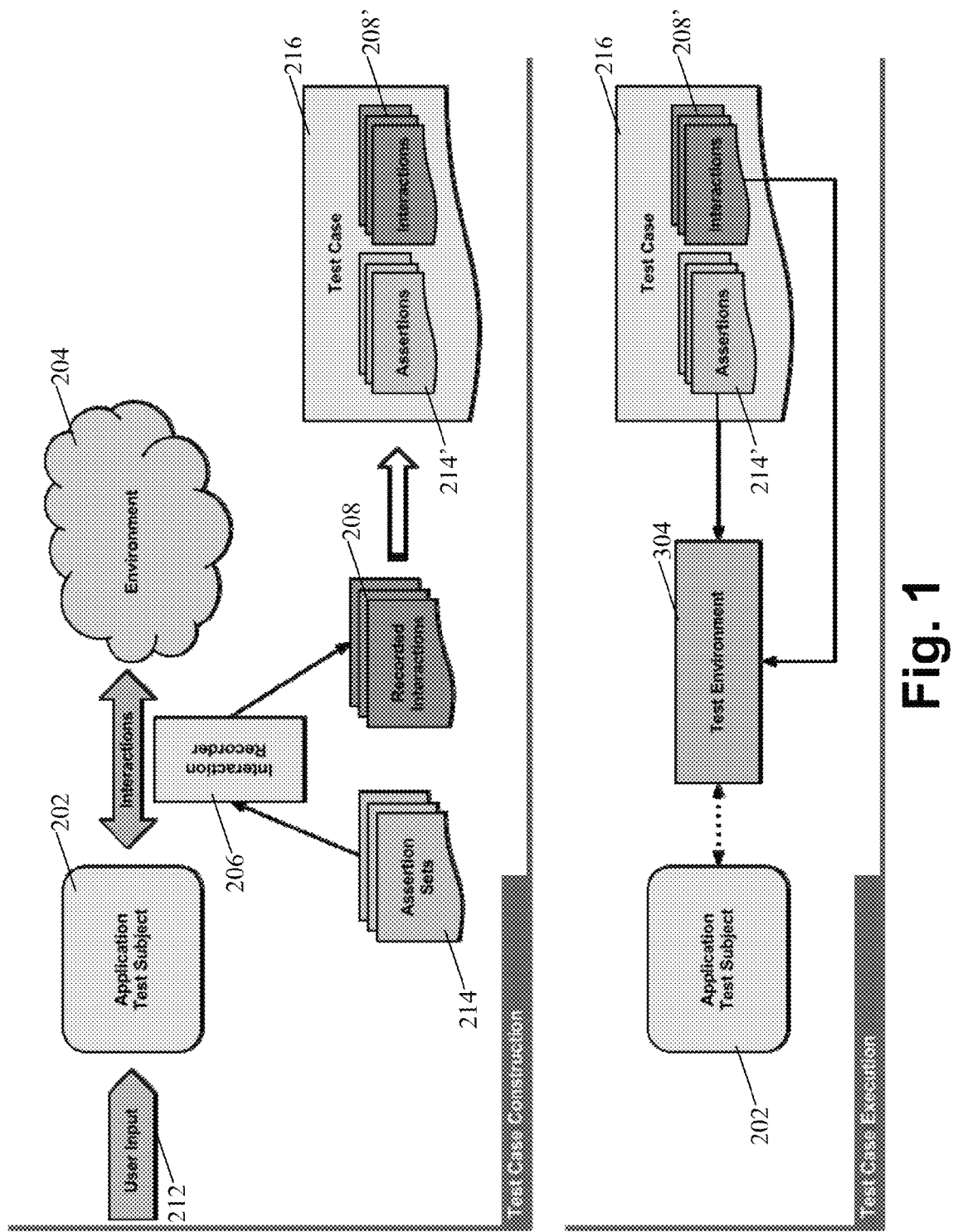
FIG. 1 depicts the two phases—namely, a construction phase and an execution phase—on which the concept of the white-box GUI testing is based.
Figure 2:
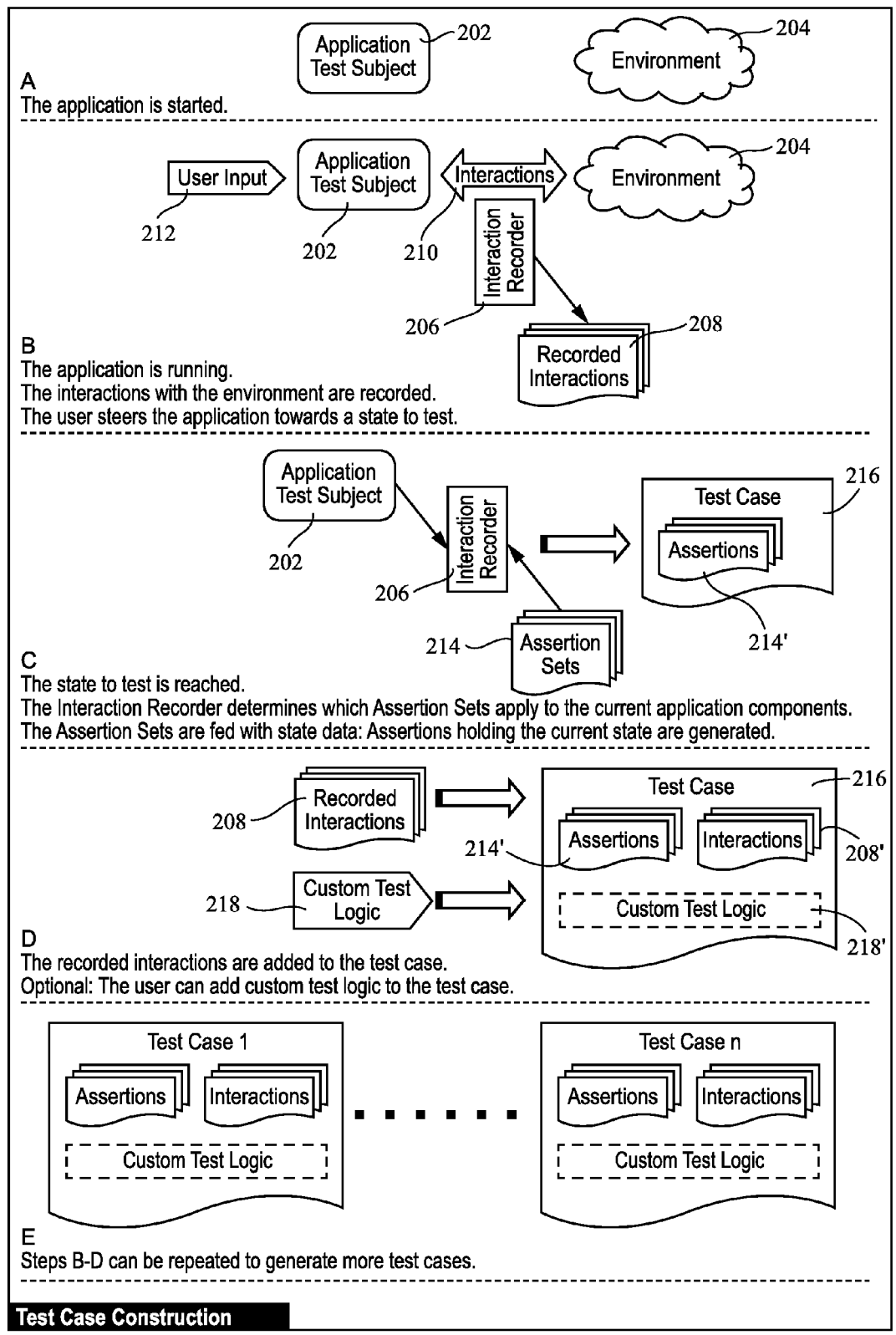
FIG. 2 reflects typical test case construction in the white-box GUI testing context.
Figure 3:
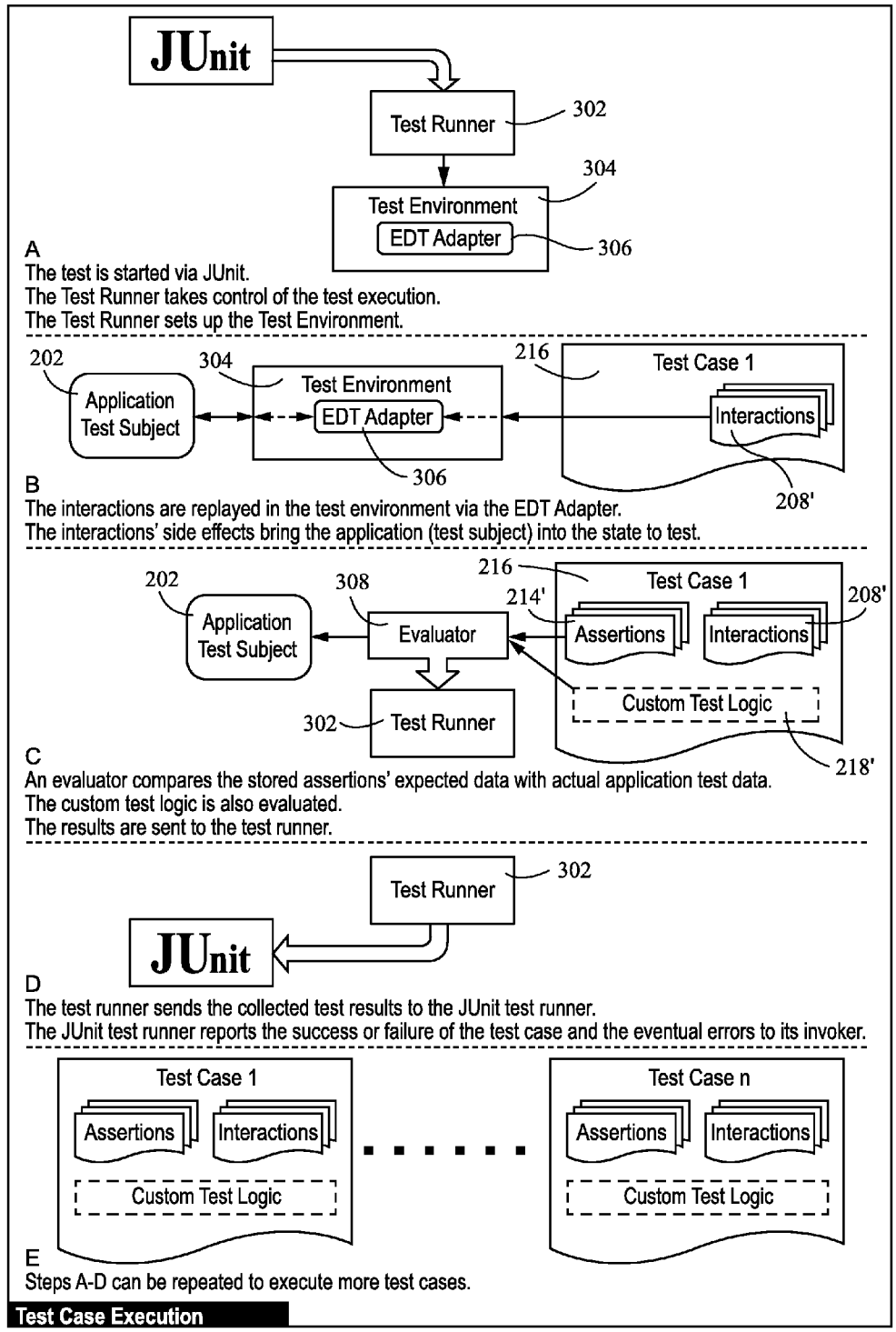
FIG. 3 reflects typical test case execution in the white-box GUI testing context.

FIG. 1 depicts the two phases—namely, a construction phase and an execution phase—on which the concept of the white-box GUI testing is based, and FIGS. 2-3 provide example further details concerning each of these phases.

Referring now to FIG. 2, which reflects typical test case construction, an application 202 is run in its normal environment 204. An interaction recorder 206 attaches itself to the running application 202 and records (e.g., to a suitable store 208) the communications and/or interactions 210 between the application 202 and components or systems lying outside the test scope. The tester conducts the application (e.g., via user input 212), steering the application towards a state to test. The interaction recorder 206 examines the application 202 for currently active components. It may search a store of assertion sets 214 for applicable assertion sets based on the type of the component that is currently active. An assertion may be thought of as a building block of the automatically generated test case and may, for example, be used to help verify that an examined state complies with an expected and predefined state. That is, in certain example embodiments, an assertion may represent an abstract state verification that already includes the verification logic but lacks the concrete state data on which the logic will be evaluated. An assertion combined with the state data may represent a concrete assertion instance, and its verification logic can be evaluated using the state data, e.g., to thereby deliver a well-defined statement about an examined unit. The term assertion therefore may be used to refer to an assertion or assertion instance, depending on context. An assertion set therefore may be thought of as a collection of assertions that target the same user interface unit and thus "belong together." An assertion set may include, for example, single assertions. The applicable assertion sets are combined with the component state data to generate assertions that hold the particular component and therefore the application state, which may be referred to in some cases as a snapshot. The tester may add additional snapshots and finish this part of the test construction by triggering the generation of a test case 216. The generated test case 216 may include recorded interactions 208' and related assertions 214' accompanied by comparison data (including, for example, the current state) for those assertions 214'. The tester may possibly add custom test logic 218' to the generated test case 216, e.g., by means of program code the realizes and/or implements the custom test logic. For instance, custom logic 218 may be user input in the form of program code or the like. Alternatively, or in addition, a custom test logic store or builder may be used to generate custom test logic 218. The tester optionally can repeat these steps to generate more test cases, potentially without having to restart the application. It is noted that certain example embodiments do not require programming knowledge for building test cases without custom test logic, although certain example embodiments nonetheless may benefit from programming knowledge (e.g., in the case where new assertion sets, etc., are written). In certain example embodiments, custom code may be stored for possible subsequent reuse. Moreover, custom test logic may be generated and stored with the generated test case itself in certain example embodiments, e.g., inasmuch as the tester may add custom logic to the generated test case and may save it directly in the test case.

Referring now to FIG. 3, which reflects typical test case execution, a general purpose test runner 302 executes the test case. In the FIG. 3 example, JUnit starts the test, with the test runner 302 taking control of the test execution and setting up the test environment 304. A test driver feeds the application 202 with a subset of the recorded interactions 208' in the test case 216 until the application 202 reaches the state at which the actual test is to be performed. The test driver uses for this task a test environment 304 that replaces the actual environment in which the application 202 normally runs. The test environment also includes an Event Dispatching Thread (EDT) adapter 306 that executes all interactions on the GUI thread (e.g., as described in greater detail below). The test case assertions 214' and the accompanying data are evaluated against actual application data, e.g., via an evaluation engine 308. Optional custom logic may also be evaluated 218'. The test results are then returned to the test runner 302, and the test runner 302 can return reports to JUnit, e.g., indicating the success or failure of the test case 216 and the eventual errors to its invoker. These steps are repeatable for additional test cases.

In order to give the user supporting tools for testing GUI components in a white-box way which, as indicated above, involves testing a component while knowing about its internals and thus testing it more thoroughly, certain example embodiments provide automatic test environment reconstruction techniques and also support unit testing.

Figure 4:
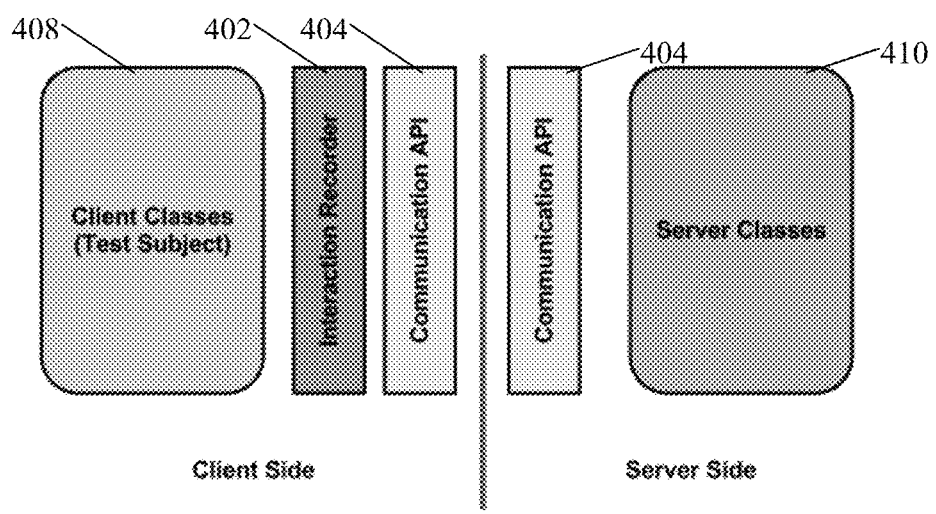
FIG. 4 is a schematic view of an interaction recorder 402 interposed between communication API 404 and client classes (test subject) 408 in accordance with certain example embodiments.

With respect to example automatic test environment reconstruction techniques, the test framework of certain example embodiments provides programmatic means for recording interactions with specific components lying outside the system subject to the test. For example, the communication with a server may be recorded for later use, if one is targeting the client part of the system for testing. The recording may take place in a temporal manner. In certain example embodiments, the recorder is a simple transparent layer that inserts itself between the communication parties. In this regard, FIG. 4 is a schematic view of an interaction recorder 402 interposed between communication API 404 and client classes (test subject) 408 in accordance with certain example embodiments. The interaction recorder 402 in FIG. 4 operates in a distinct layer between the application code (e.g., client class 408 and server class 410) and the API 404, so that it can completely replace the latter at test execution time in certain example implementations. This example arrangement helps to simplify the task of replaying the recorded messages, since the communication layers are more low-level and therefore typically harder to instrument and simulate. In addition, the recorded messages may become more human readable and can be altered by the developer for testing purposes. This approach is readily contrastable with a recorded TCP-IP communication (e.g., including chunks of exchanged bytes) compared to structured XML messages. That is, structured XML messages typically are far easier to read for humans than blocks of TCP-IP communications. It will be appreciated that one could interpose the recording device between APIs in certain example embodiments, although this approach may sometimes result in a more complicated implementation that possibly represents a solution potentially closer to a black-box testing approach.

The recorded interaction (or communication) can be replayed later, potentially without the communication counterpart, thus removing dependencies to the external system components. This also may in some cases relieve the developer of writing so-called mock objects that mimic communication counterparts.

Although many formats may be used, one example format that the recorder may use to save the exchanged messages is as follows:

| FIELD | DESCRIPTION |
|---|---|
| Identifier | Unique code identifying the message. |
| Name | Message name: human-readable text derived from the application source code. |
| Timestamp | The time the message has been sent or received, measured in milliseconds. While the time point is important for the replay delay, the exact order is dictated by the message identifier. |
| Data Field 1 | Data field name followed by its actual value. |
| Data Field 2 | ... |
| Data Field ... | ... |
| Data Field n | ... |

It is noted that n in the table above represents the number of data fields depends on the type of the recorded message.

Once the recorded interaction has been replayed, the developer has brought the test subject to a specific and well-defined state upon which further tests can be conducted. Bringing the test subject to this state conventionally has been a tedious and frequently error prone task that is sometimes almost impossible to do programmatically, particularly where GUI components are the test subjects. Another benefit is that simply replaying recorded interactions can be considered a sort of regression test, generated and run without any specific coding. Further details concerning this sort of regression test are provided below.

Figure 5:
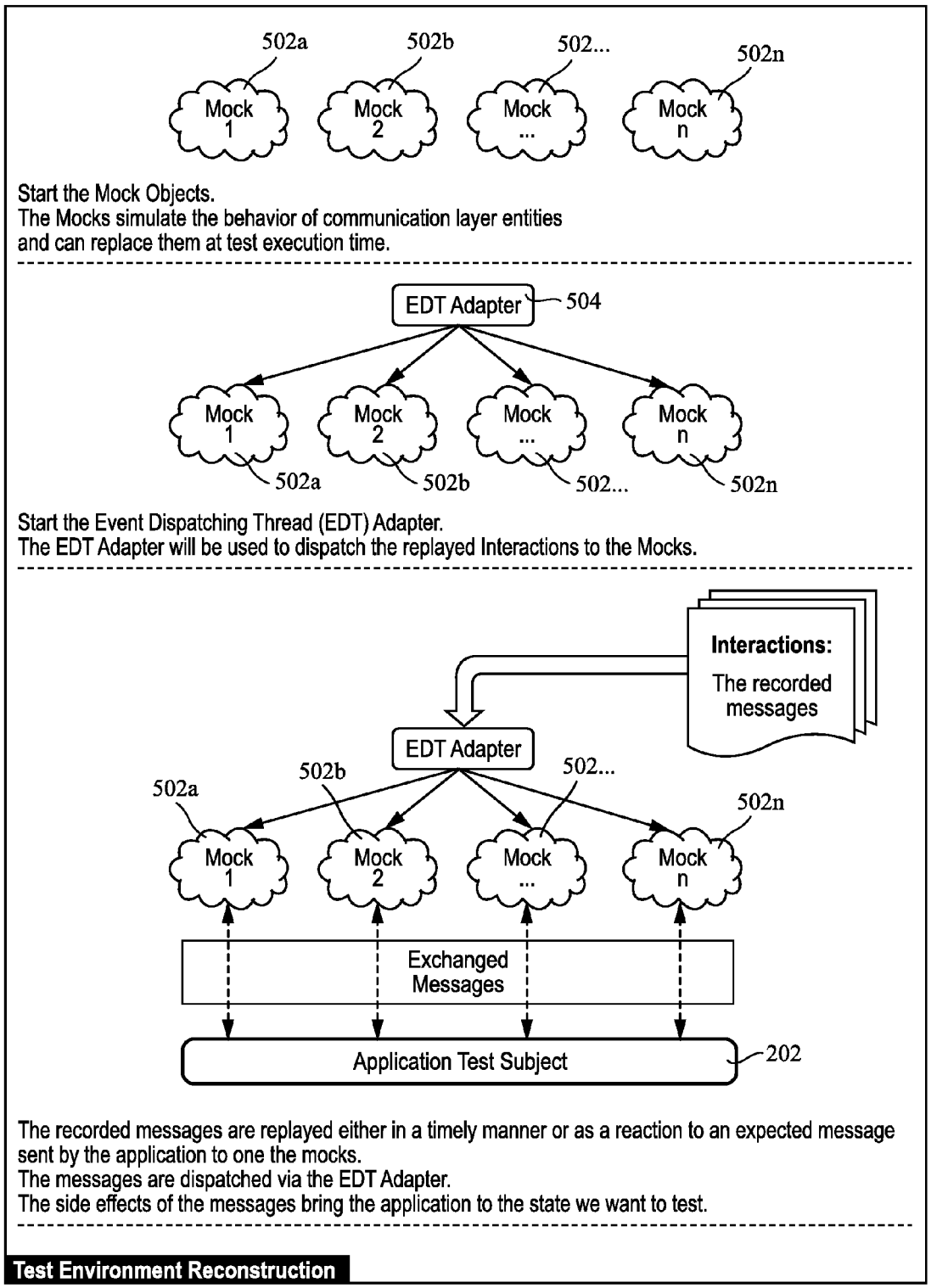
FIG. 5 schematically illustrates test environment reproduction in accordance with certain example embodiments.

FIG. 5 schematically illustrates test environment reproduction in accordance with certain example embodiments. As shown in FIG. 5, mock objects 502*a-n* are started, with such mocks 502*a-n* simulating the behavior of communication layer entities and replacing them at test execution time. The EDT adapter thread 504 is started and used to dispatch the replayed interactions to the mocks 502*a-n*. The recorded interactions (messages) are replayed in a timely manner (e.g., synchronously, as a reaction to an expected message sent by the application to one of the mocks, etc.) and are dispatched via the EDT adapter 504. The side effects of the messages bring the application to the desired test state.

As indicated above, the test framework in certain example embodiments also provides support for unit testing. For instance, certain example implementations may integrate with JUnit, which is a widespread and well established unit testing framework. Although JUnit is used in the examples that follow, it will be appreciated that different example implementations may integrate with JUnit and/or other components. Moreover, some example embodiments may include their own, self-contained unit testing framework.

In certain example embodiments, the test framework may include an API following the JUnit API style. Thus, code written for JUnit test cases may be simply used in the framework's unit tests in certain example implementations. The JUnit API is based on a set of logical assertions on basic data types. The API provided in certain example embodiments may also support pluggable assertion sets that can be reused for generic or custom GUI components.

The test framework of certain example embodiments may be able to automatically generate test code that includes the recorded interactions. The developer can also extend the generated cases by custom test logic.

The basic and generic test case provided by the framework may be extended from JUnit's in certain example embodiments. Accordingly, the developer may benefit from a seamless integration of the framework with possible JUnit test runners including, for example, the IDEs (e.g., IntelliJ IDEA or Eclipse) and the automatic test runners of Continuous Integration (CI) services (e.g., Jenkins/Hudson, CruiseControl, BuildMaster, etc.).

Normally, JUnit test cases are run on the main thread or a special default thread called when a program is started. In the case of the GUI programs, prior to Java 6, it was not recommended to run GUI code outside of the EDT. Since Java 6, this recommendation has become an expectation: Any GUI code run outside the EDT may lead to unexpected program behavior. To avoid unexpected behavior, the GUI test cases that actually contain GUI code must be run on the EDT. This also helps guarantee a consistent behavior of the program during and after the tests. The lack of EDT support in all known test runners for this kind of test execution, however, poses a significant challenge for conventional techniques. By contrast, in certain example embodiments, the test framework may use helper classes to run the test cases on the EDT, as described in greater detail below.

As alluded to above, the regression test generation may be related to the automatic test environment reconstruction feature of certain example embodiments. After recording interactions between the test subject and its environment, the framework can take a snapshot of the current test subject state and generate a test case that assures that the tested component complies with the recorded state. If the test is run at a later point in time (e.g., after considerable modifications have been made to the component code), the test essentially acts as a regression test in that it helps ensure that the component still complies with its past recorded behavior. In order to achieve this feature, the framework of certain example embodiments may use the assertion sets that apply to the test subject to automatically convert them to regression tests.

Certain example embodiments may incorporate helper functions, e.g., to facilitate better integration with existing software products, making maintenance easier, etc. One example helper function relates to a runtime attachment framework that attaches to a running application and runs code inside it. The framework may also be able to access data and classes of the application to which it is attached. The attachment framework of certain example embodiments enables the development of test code outside the code basis of the target application. In other words, all code related to the testing framework may be developed and maintained outside the target application code base, thereby helping to guarantee that there are no interactions with the application and that there are no side effects caused by the test code. The only interactions happen at runtime (when the application is running). Also, there is no need for a special application version targeted for testing purposes.

A benefit of the attachment framework of certain example embodiments relates to improved maintainability of the test code. Normal black-box GUI testing records interactions with the GUI and uses as references component names, visual clues extracted from the tested application while it is running, etc. These references remain stable and do not change within a specific application version, but are highly susceptible to changes in later versions. The mentioned references therefore may need to be manually synchronized upon changes made to the application; otherwise, tests written for an earlier version may not run as expected in connection with newer versions. However, certain example embodiments help avoid this problem, as the attachment framework advantageously allows the test cases to be written side-by-side with the target application code base—but not inside that code base, thereby maintaining separation of concerns. This approach in turn allows the developer to run the same modifications on both application and test code, in that the modifications mainly include refactoring accomplished by means of the used IDE. This makes GUI testing more like unit testing, where the developer and tester profit from the mentioned maintainability benefits.

Because the test framework adheres to the idea of unit testing and also allows the test code to exist side-by-side with the application's code, it is possible to leverage the automatic test coverage metrics current IDEs provide. Thus, it will be appreciated that certain example embodiments support test coverage by design. In practice, each constructed test case may result in a unit test class that can be automatically matched by the IDE to the GUI classes targeted by the test case. The test coverage metrics may compute the percentage of GUI classes that have been tested. This is sometimes called unit test coverage because it operates on the compilation units of the GUI. Another possibility for calculating test coverage metrics involves the statement/block test coverage. Like the unit test coverage, the IDE can match methods of the tested GUI classes to assertion instances present in the test case and thus calculate how many and/or what percent of code blocks of a certain class have been covered by one or more test cases. Other metrics can be supported and include, for example, branch coverage and path coverage (e.g., by replacing the test case data that is normally stored in a separate XML file with actual program code that can by analyzed and understood by the IDE), etc.

Example Implementation

This section describes an example implementation of white-box GUI testing for an illustrative Software AG product. It will be appreciated that this implementation can be adapted to Java applications and/or the like. It is also possible to port the whole framework to another platform such as, for example, the .net and/or other frameworks that are similar to or different from Java.

The example implementation can be roughly visualized in three steps. In a first step, the test cases are built from running the application. The FIG. 6 screenshot is an example running program from which the test cases may be built. It will be appreciated that the FIG. 6 screenshot depicts a generalized GUI including standard GUI elements such as, for example, tools, control panes, text output, etc. In a second step, a class file and an XML file including the assertions and interactions may be automatically generated. FIG. 7 shows the outline of an example class file and an example XML file including the automatically generated assertions and interactions in the upper and lower portions, respectively, in accordance with an example embodiment. In a third step, the new test case can be run using a JUnit test runner. Because all services the tested program interacts with are being mocked during the test execution phase, there is no need to start any other parts of the application such as, for example, server modules or database services. It thus will be appreciated that the test case can be run fully autonomously in some instances.

Figure 6:
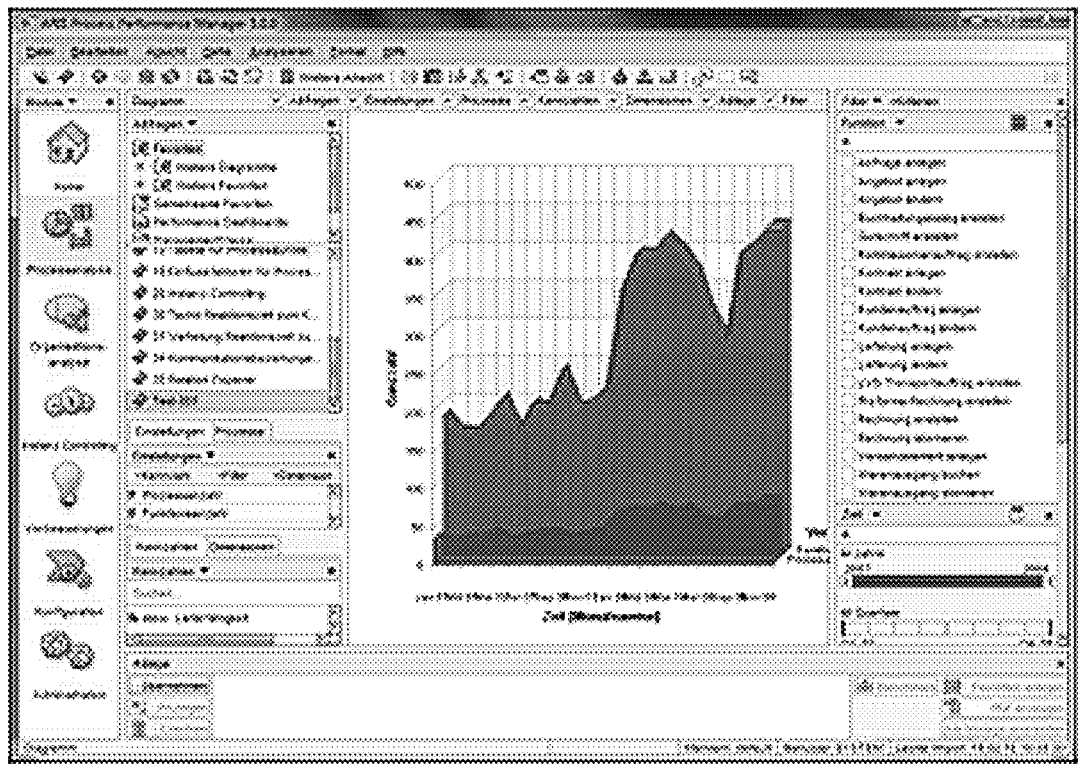
FIG. 6 is a screenshot of an example running program from which the test cases may be built in accordance with certain example embodiments.
Figure 7:
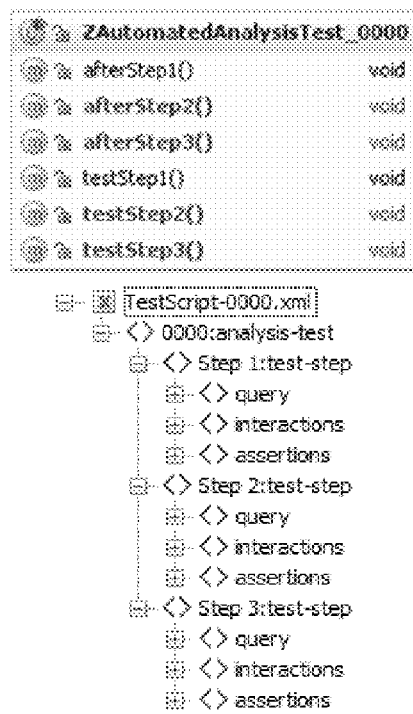
FIG. 7 shows outlines of an example class file and an example XML file including the automatically generated assertions and interactions in the upper and lower portions, respectively, in accordance with certain example embodiments.
Figure 8:
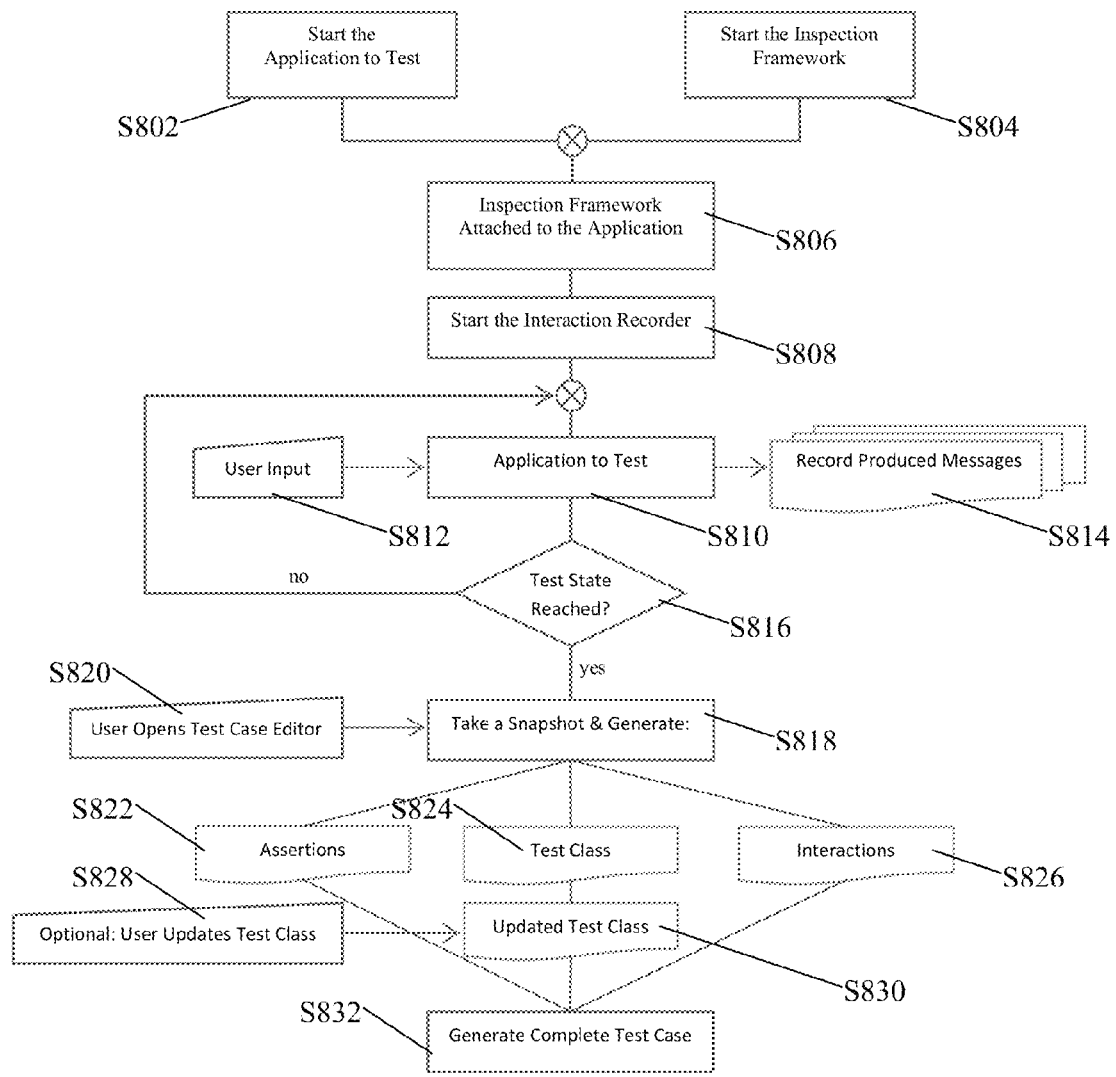
FIG. 8 is a flowchart illustrating how the techniques of certain example embodiments may be applied to the sample GUI application shown in FIG. 6, e.g., to generate a test case.

FIG. 8 is a flowchart illustrating how the techniques of certain example embodiments may be applied to the sample GUI application shown in FIG. 6, e.g., to generate a test case. As shown in FIG. 8, the application to be tested is started in step S802, and the inspection framework is started in step S804. The inspection framework is attached to the application in step S806, and the interaction recorder is started in step S808. In step S810, the application to test runs and optionally receives user input in step S812. Produced messages and/or communications are recorded in step S814. A determination as to whether the test state is reached is made in step S816. If it has not been reached, then the process loops back to step S810 and the application is allowed to continue to run, accept user input, record produced messages, etc. If the test state has been reached, then a snapshot is taken in step S818, e.g., as the user opens the test case editor in step S820. This causes the generation of assertions (in step S822), a test class (in step S824), and interactions (in step S826). Optionally, a user may update the test class in step S828, prompting the creation of an updated test class (in step S830). The complete test case is then generated in step S832.

1. Example Inspection Framework

Figure 9:
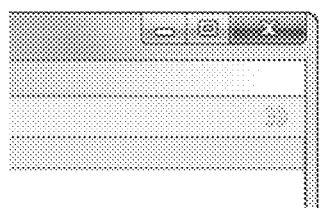
FIG. 9 shows a portion of a main window before the inspection framework is attached to the running application in accordance with certain example embodiments.
Figure 10:
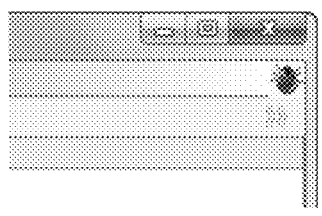
FIG. 10 shows the same portion of the main window as in FIG. 9, but after the inspection framework is attached to the running application in accordance with certain example embodiments.

The runtime attachment framework may in certain example embodiments be realized as a general purpose inspection framework. This framework may represent a tool that can attach to a running Java Virtual Machine (JVM), e.g., via the Java RMI API. The framework may in some implementations inject executable code into a running application by means of Java Instrumentation and Agent API. In general, this means a developer can add any functionality to an existing application without necessarily modifying its code. The injected functionality can even access all classes and data of the attached application, if so desired. This example framework thus may advantageously create a number of opportunities for inspection tools for example debugging, creating reports, remote assistance, remote maintenance, etc. In certain example embodiments, the inspection framework may be used to inject the interaction recorder and test case construction user interface. It also may add a distinguishable button to the main program window, e.g., so that the tester can decide at which moment the state of the application can be transformed to a test case. In this vein, FIG. 9 shows a portion of a main window before the inspection framework is attached to the running application in accordance with certain example embodiments, whereas FIG. 10 shows the same portion of the main window after the inspection framework is attached to the running application in accordance with certain example embodiments. As can be seen by contrasting these drawings, a ladybug button has been added to main window to indicate the attachment and enable the transformation to the test case.

2. Example Test Case Editor

After starting the application to test and running the runtime attachment framework, the tester drives the application into the state to be tested. When the desired state is reached, the tester can click on the "injected" ladybug button (e.g., as shown in FIG. 10) in order to open the test case editor.

Figure 11:
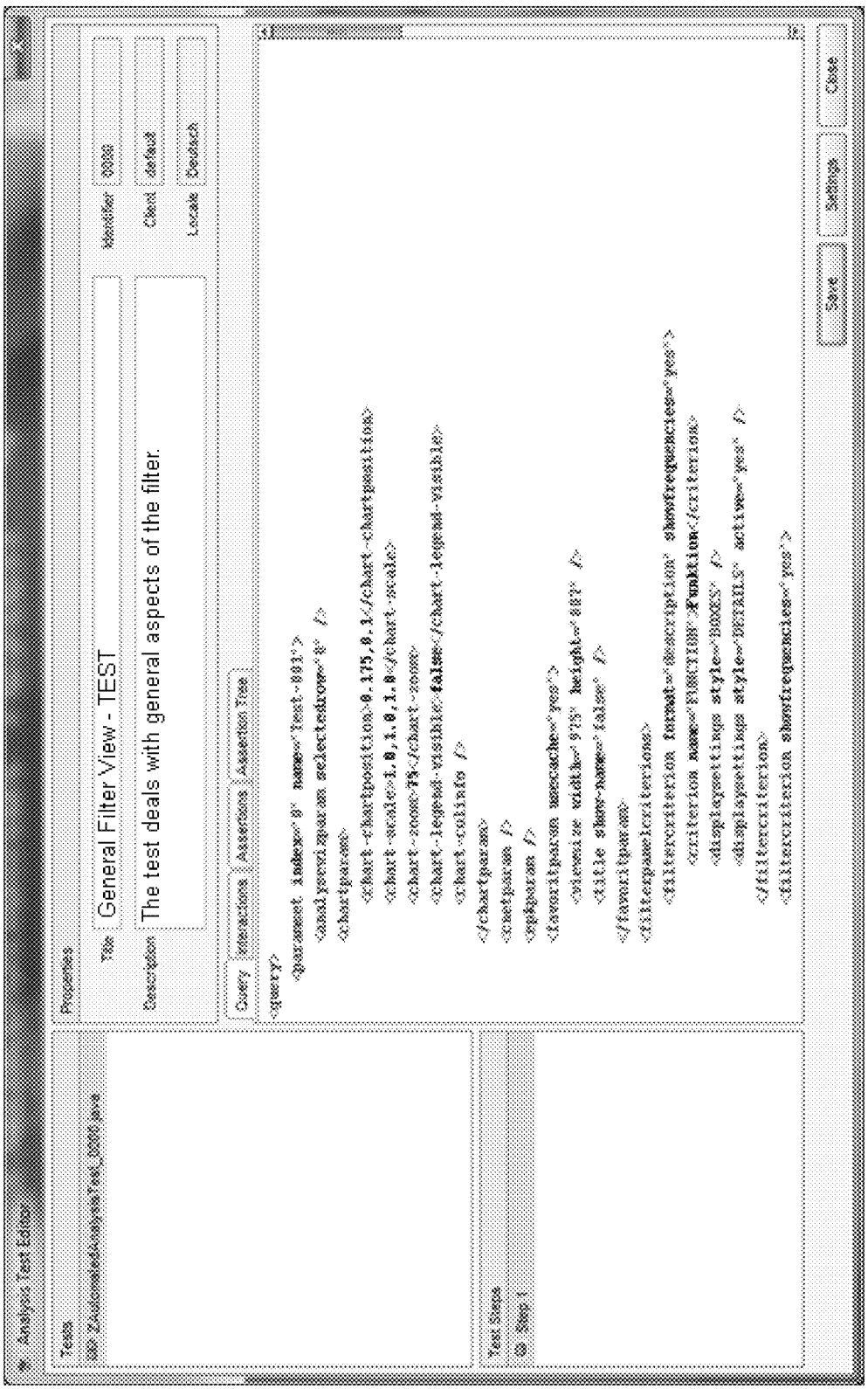
FIGS. 11-14 are illustrative screenshots of different test case editor views, in accordance with certain example embodiments.
Figure 12:
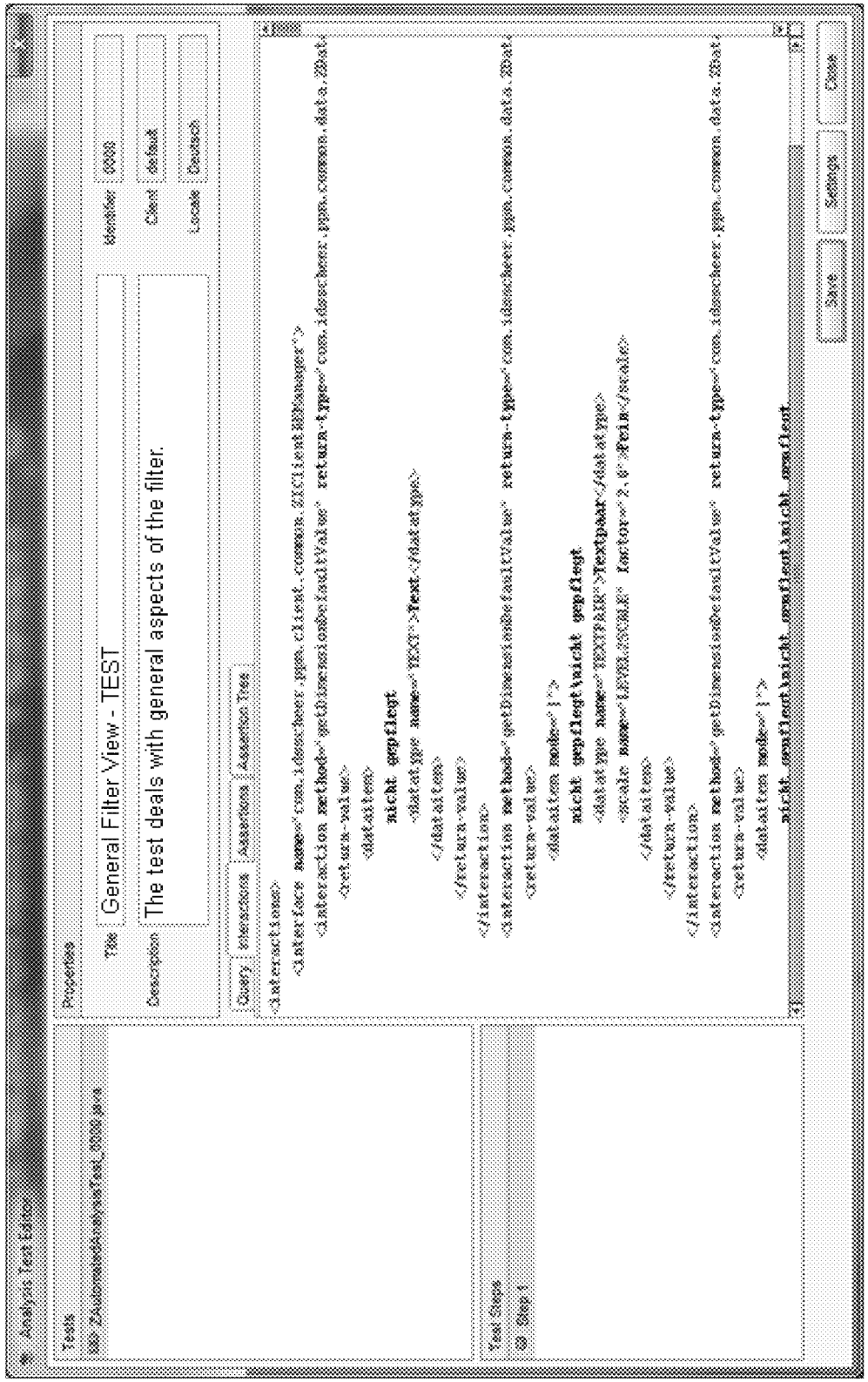
Figure 13:
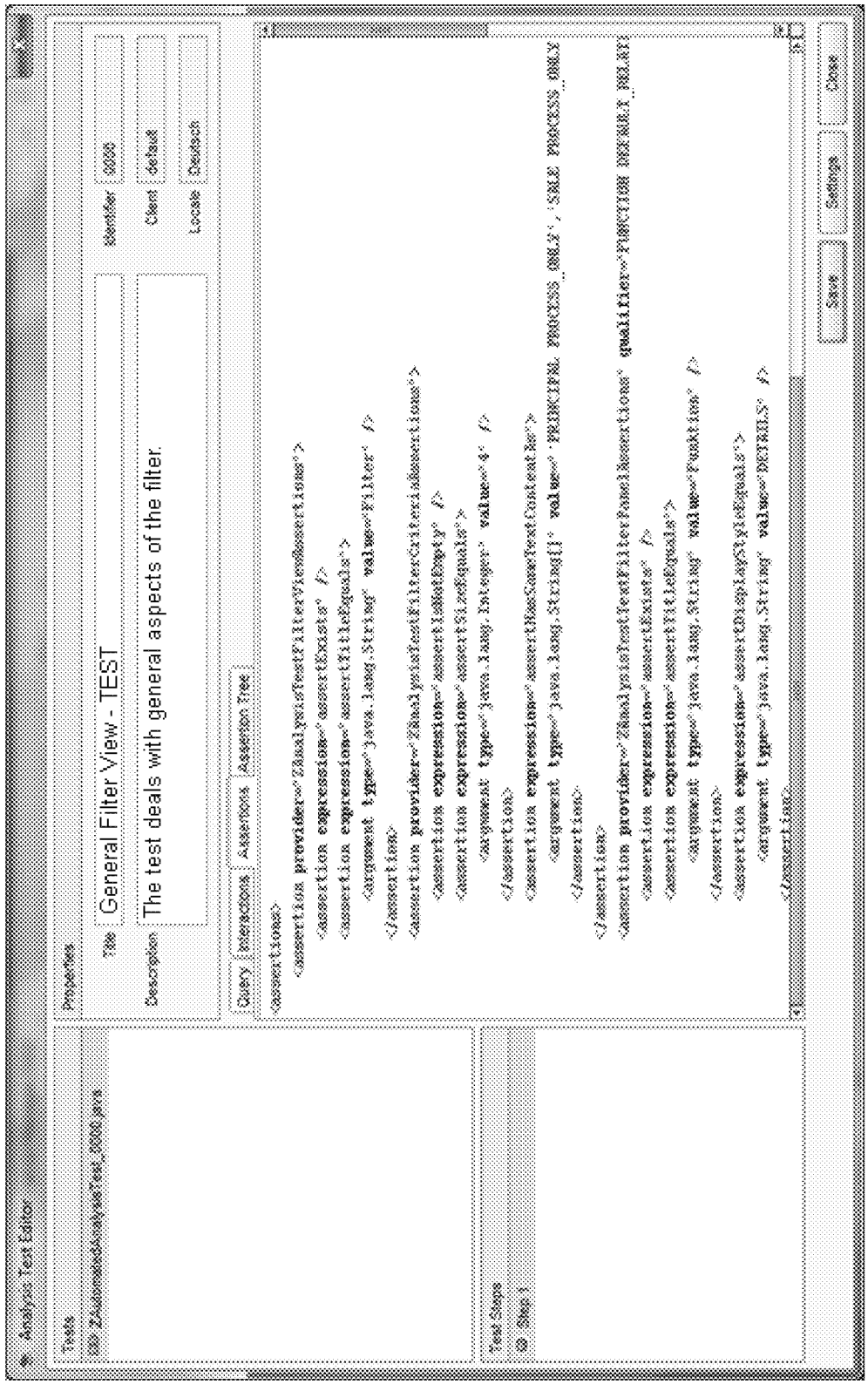
Figure 14:
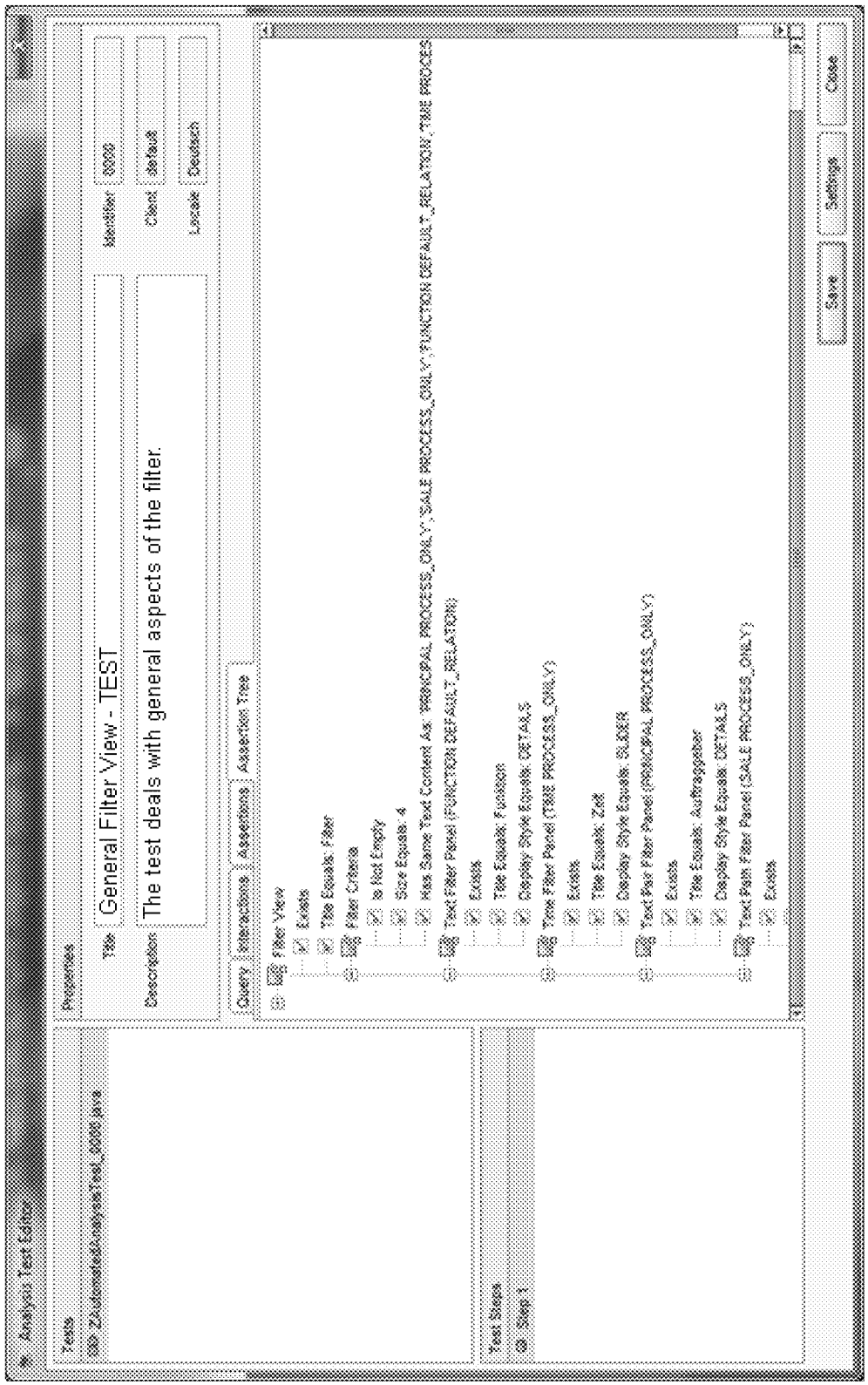

FIGS. 11-14 are illustrative screenshots of different test case editor views, in accordance with certain example embodiments. More particularly, FIG. 11 is an example query view; FIG. 12 is an example interactions view; FIG. 13 is an example assertions view, showing the XML code corresponding to the assertions; and FIG. 14 is an example assertions view, showing a tree structure corresponding to the assertions. Each of the example screenshots shows the defined tests and test steps, as well as certain properties (which in this example include the title and a brief description) for the test. The XML Data may have many sources. For example, the interactions may be produced by the interactions recorder, which translates communications between the software and the outside world (other system components/servers/parts) into messages with the XML format. The query is a special interaction message and may be given a separate tab to emphasize its importance. The assertions may be stored in an XML format that contains references to the assertion set and to single assertions and that also includes some reference data, if needed (e.g., data taken from the snapshot and saved for later comparison with data extracted from an actual test subject). All the XML data may be put together in a single file, and that file may be attached to the generated test case. The XML data may remain editable but preferably is changed only by developers. There are several general reasons to change the data. For instance, data changes may be made to reflect changes made to the system, so that reference data must be changed or the developer/tester needs to generify the test case data. Another example relates to adapting it to a slightly similar case. The data may use human-readable terms so that it can be understood without further processing.

3. Example Generated Test Cases

Figure 15:
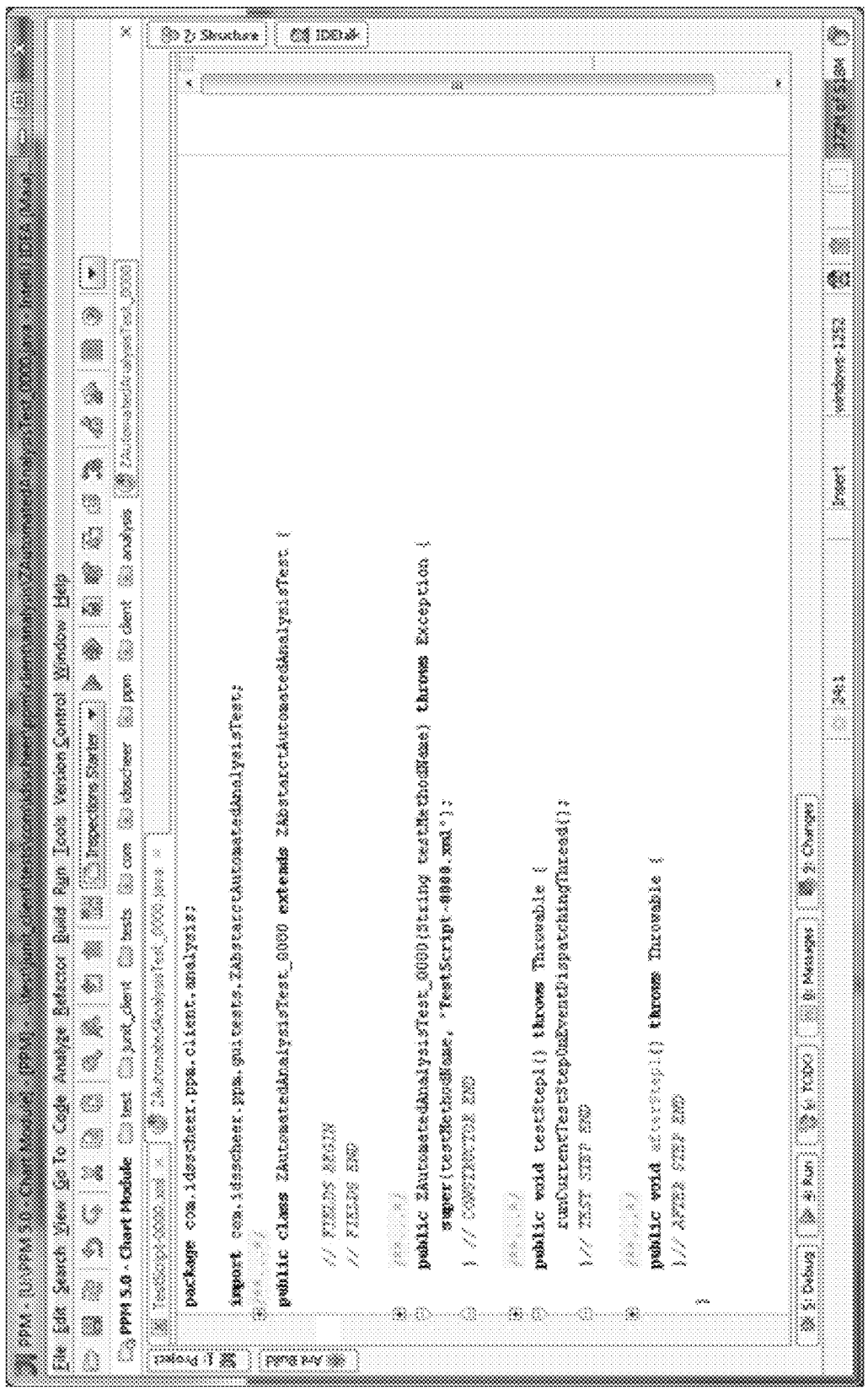
FIG. 15 shows a portion of an example generated test case class file, in accordance with certain example embodiments.
Figure 16:
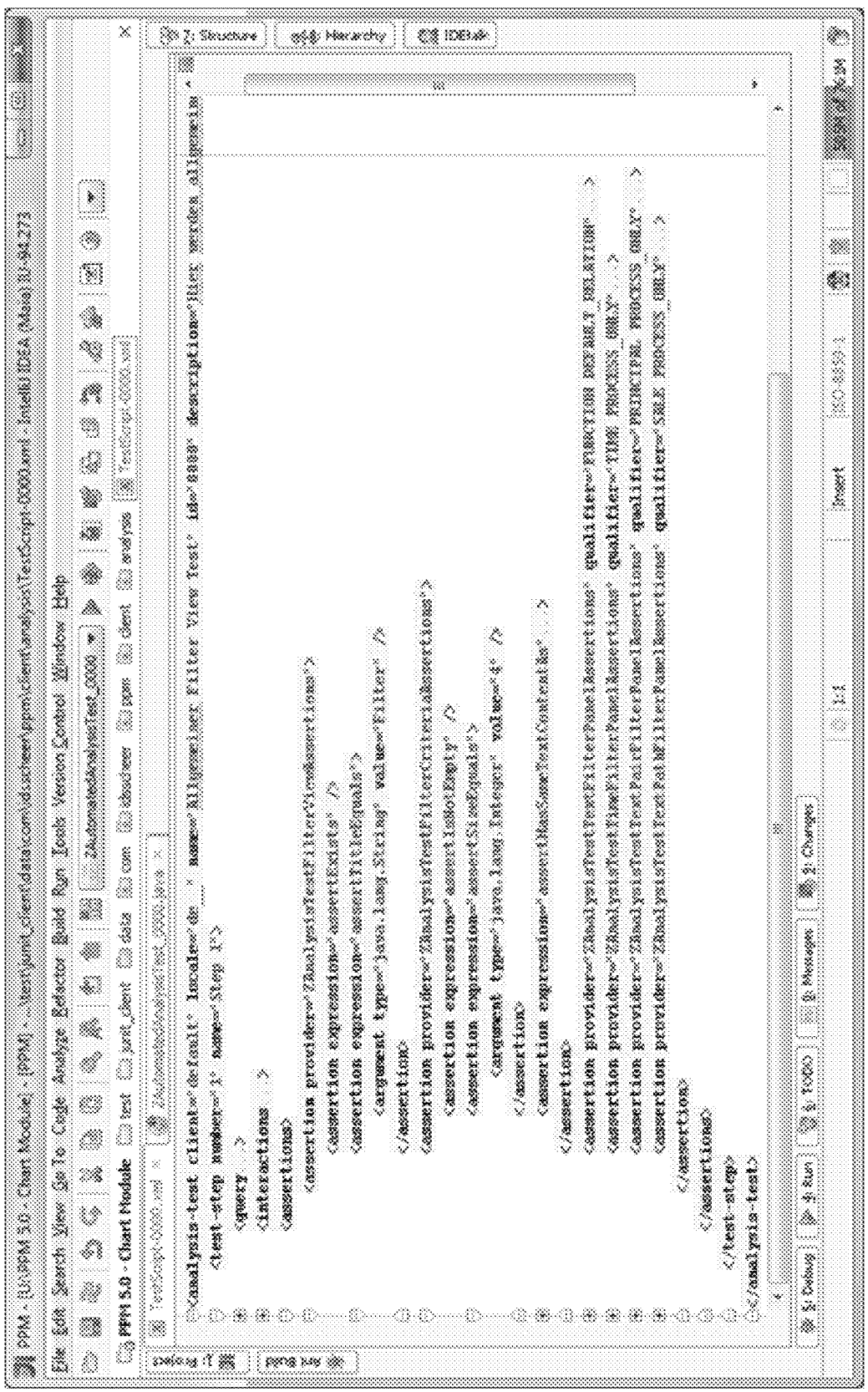
FIG. 16 shows a portion of a generated XML file for interactions, assertions, and their expected values, in accordance with certain example embodiments.

Upon clicking the save button on the test case editor, both a class file containing a generic test case and an associated XML data file containing the interactions and the assertions with expected values are automatically generated (and potentially saved to a storage location). The tester may add custom test logic to the generated test case class. For instance, the tester may use the default assertion sets, define custom assertion sets, use JUnit assertions, etc. In this vein, FIG. 15 shows a portion of an example generated test case class file, in accordance with certain example embodiments; and FIG. 16 shows a portion of a generated XML file for interactions, assertions, and their expected values, in accordance with certain example embodiments.

4. Example Test Runner

Figure 17:
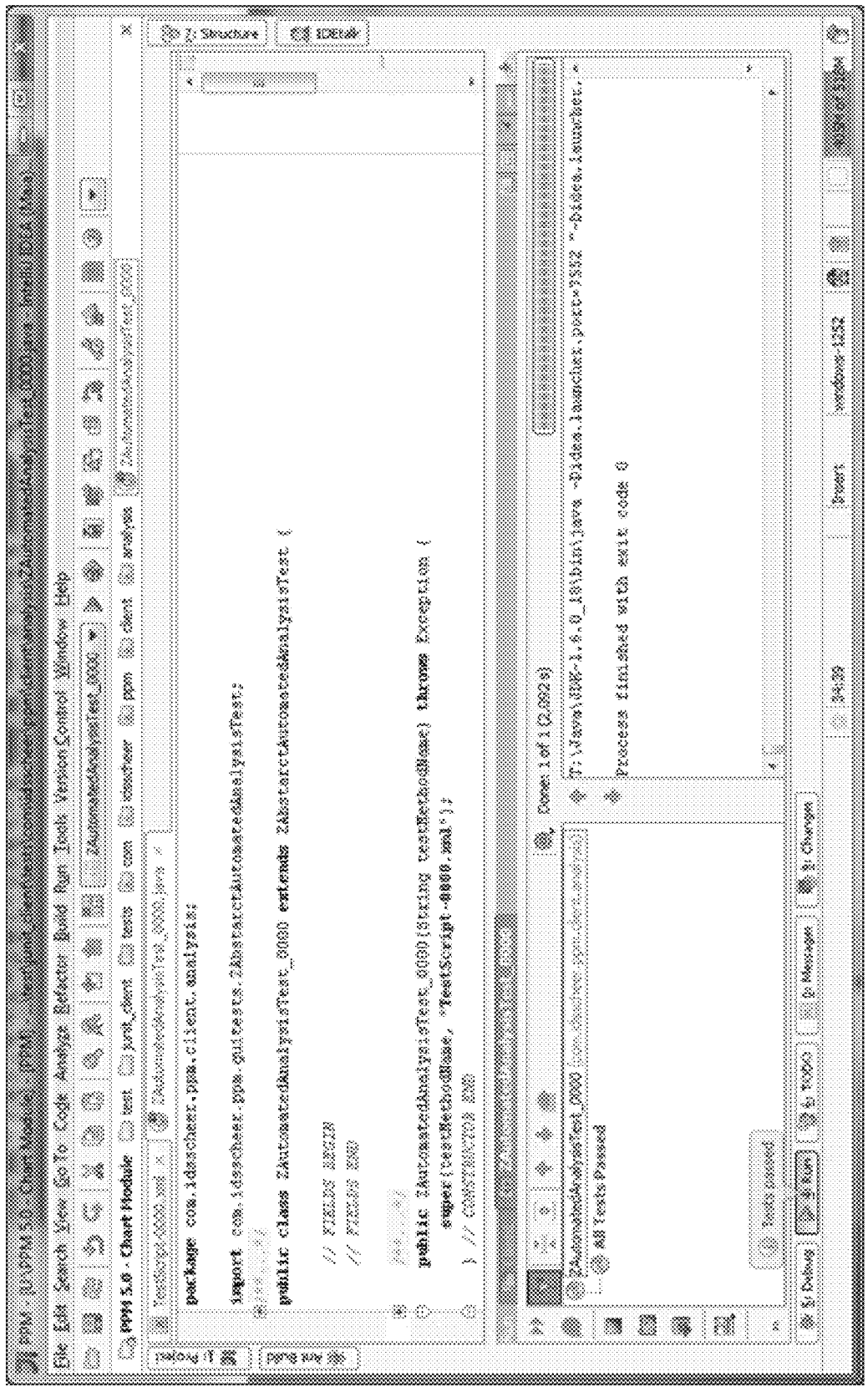
FIG. 17 is an example screenshot showing a successful test case executed in the JUnit test runner in accordance with certain example embodiments.
Figure 18:
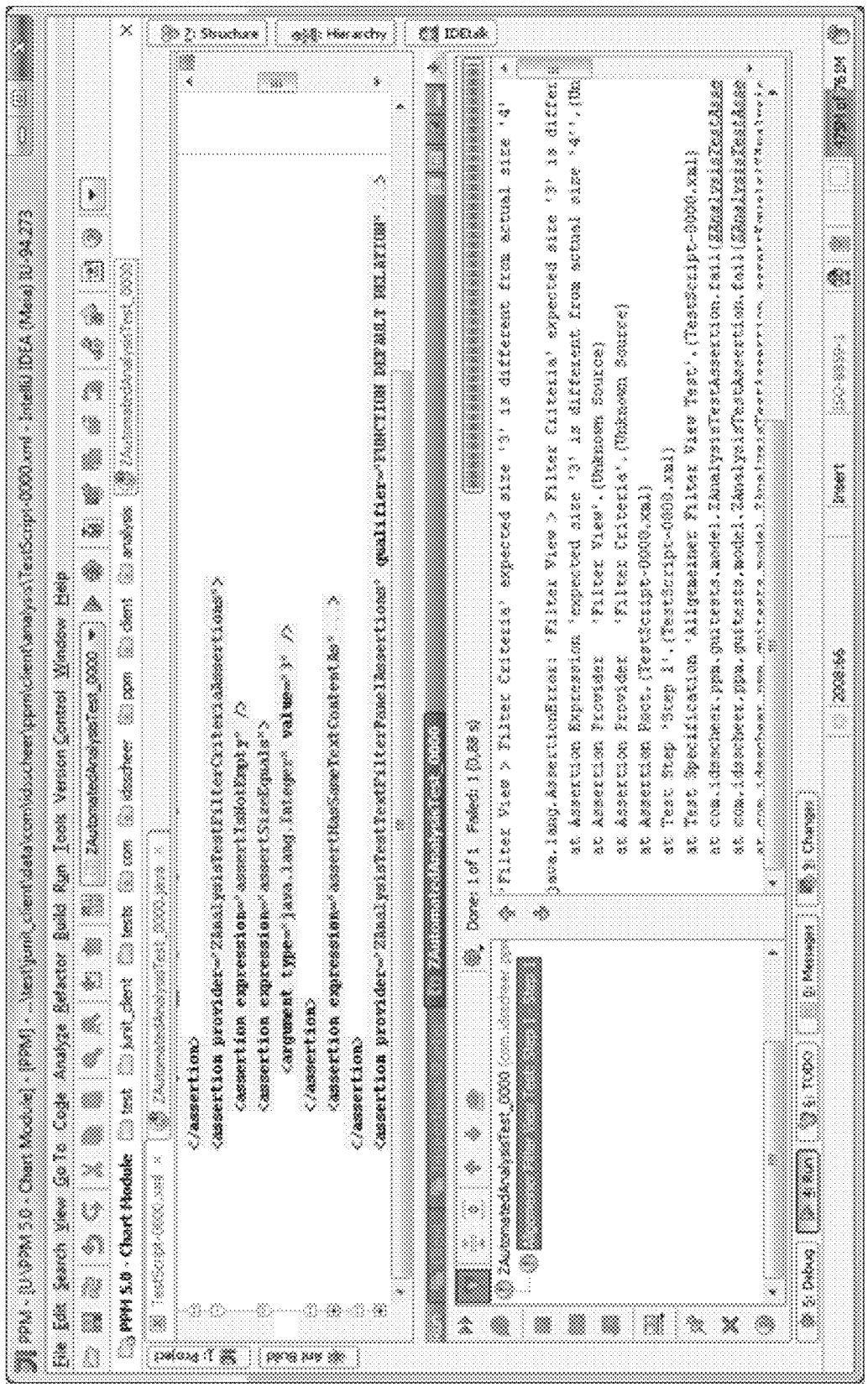
FIG. 18 is an example screenshot showing a failed test case executed in the JUnit test runner in accordance with certain example embodiments.

The generated test case including its data can be executed as a normal JUnit test case. The default JUnit test runner of the IDE is shown in the FIG. 17-18 example screenshots, illustrating this example scenario. Of course, it will be appreciated that other test runners (such as, for example, TestNG) may also be supported in certain example embodiments. More particularly, FIG. 17 is an example screenshot showing a successful test case executed in the JUnit test runner in accordance with certain example embodiments, and FIG. 18 is an example screenshot showing a failed test case executed in the JUnit test runner in accordance with certain example embodiments. As can be seen from FIG. 18, the JUnit test runner adapter shows an extended stack trace with the exact location of the failure within the component tree. This mechanism represents an additional means that is not provided by standard Java stack traces.

5. Example Assertion Sets

Figure 19:
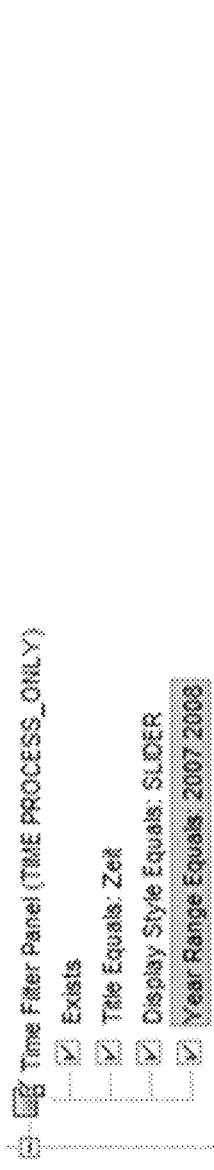
FIG. 19 shows an example assertion in its XML and tree forms.
Figure 20:
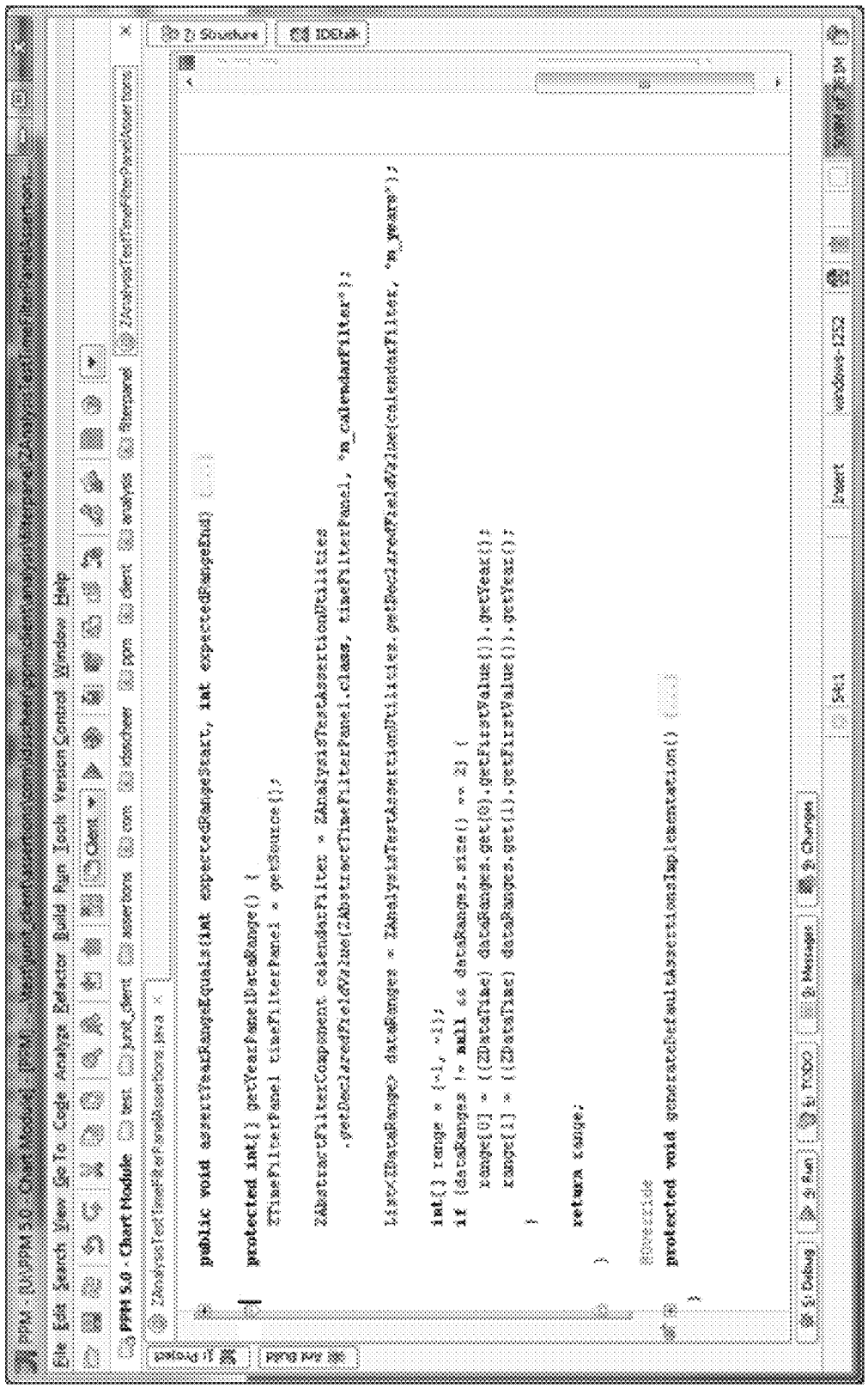
FIG. 20 shows an example implementation for the assertion.

The assertion sets used in the test framework can be understood as verification expressions/rules. The assertion sets may be evaluated at test execution time against values observed at test construction time. FIG. 19 shows an example assertion in its XML and tree forms, and FIG. 20 shows an example implementation for the assertion.

6. Example Running of Test Cases on the Event Dispatching Thread (EDT)

As indicated above, test cases involving GUI element generally must be run on the dedicated GUI thread and, in certain example embodiments, this is the Event Dispatching Thread (EDT). Similar comments apply for non-Java platforms including, for example, the .net and Qt frameworks.

Figure 21:
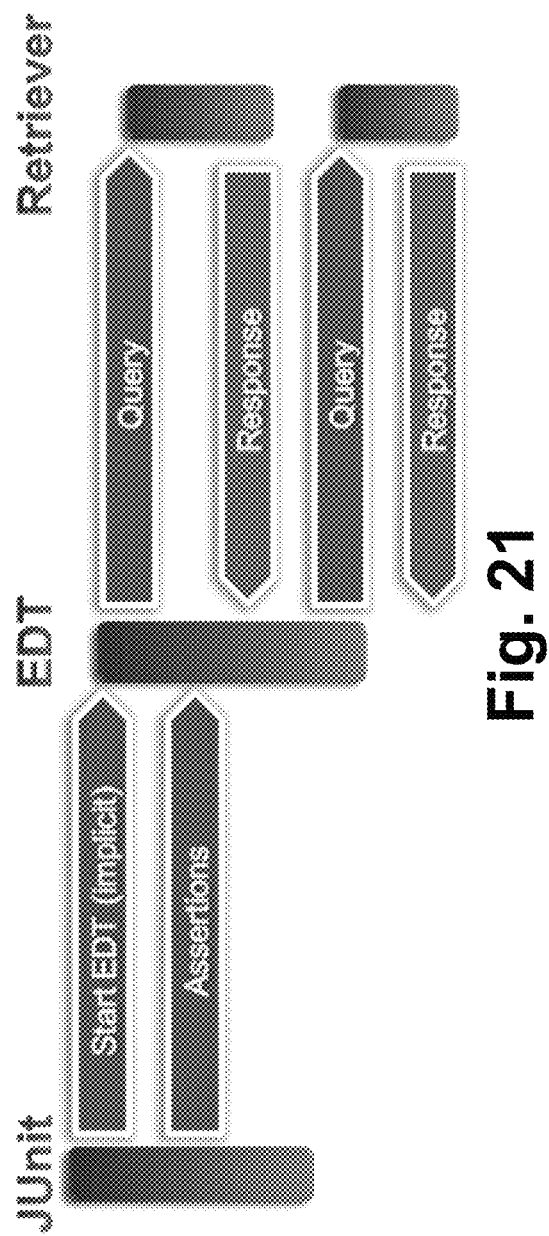
FIG. 21 shows a test case running on the wrong thread.

FIG. 21 shows a test case running on the wrong thread which, in this case, is the JUnit thread. It calls unsynchronized methods on the GUI thread, which is the EDT. In general, synchronization refers to the coordination of simultaneous threads to complete a task in order to obtain correct runtime behavior and avoid race conditions. These methods also call methods managing the communication with a server and running on another thread called "Retriever." As can be appreciated from FIG. 21, assertions about the GUI should be checked. At the time these assertions are checked, the EDT is still interacting with the Retriever and has not received all responses yet. This leads to an indeterminate state and renders all tests useless.

Figure 22:
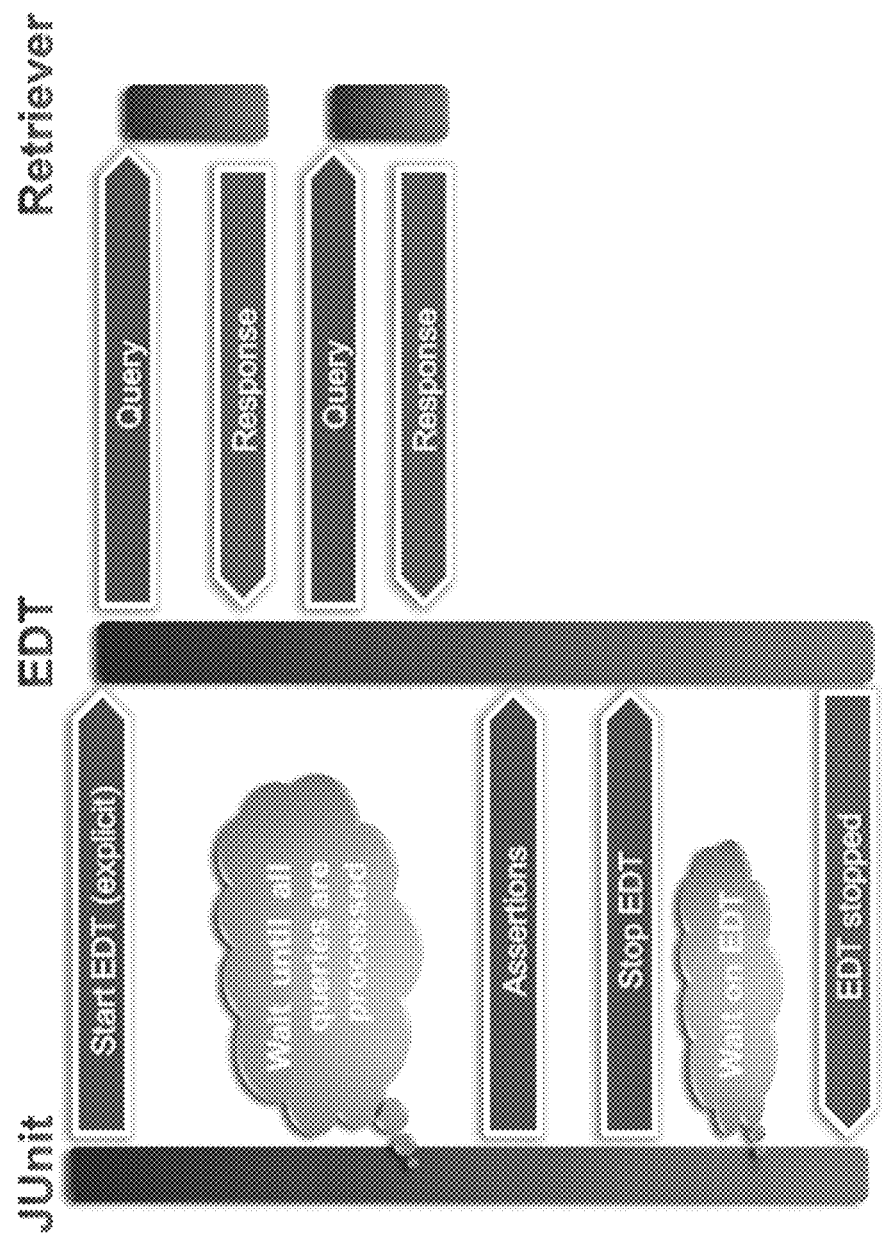
FIG. 22 shows the test case running synchronously with the GUI threat in accordance with certain example embodiments.

This problem may be solved in certain example embodiments by providing helper classes that adapt the test case runner to work synchronously with the EDT. As depicted in FIG. 22 (which shows the test case running synchronously with the GUI thread), the test runner thread (called JUnit) waits for the EDT to finish its interaction before the assertions get evaluated. This behavior helps guarantee consistent results and obeys the rules of Java GUI programming.

Figure 23:
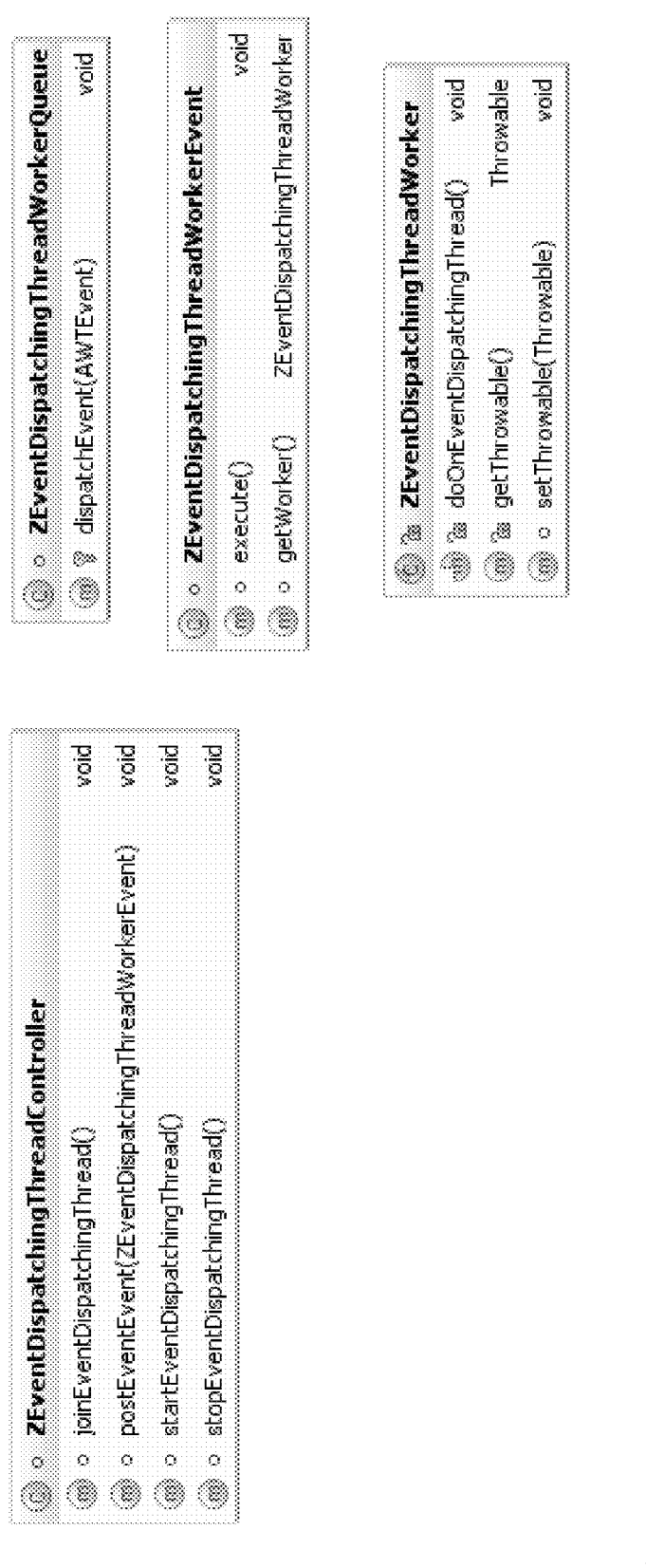
FIG. 23 shows several example classes that represent the implementation of the JUnit test runner adapter for the EDT, according to certain example embodiments.

FIG. 23 shows several example classes that represent the implementation of the JUnit test runner adapter for the EDT, according to certain example embodiments. The supporting and helper classes are used by the internal test driver (which in some implementations is the framework's component responsible for executing the internal test steps) to control the EDT. The following outline is an illustrative class and corresponding method description for the FIG. 23 example:

ZEventDispatchingThreadController:
  The class creates its own event queue and prepends it to the system event queue of the user interface. It also holds a reference to the current GUI thread (EDT).
  joinEventDispatchingThread( ):
    This method can be used to wait for the normal termination of the GUI thread.
  postEventEvent(ZEventDispatchingThreadWorkerEvent):
    This method provides the ability to post custom events to the system's event queue. See ZEventDispatchingThreadWorkerEvent for a description of custom events.
  startEventDispatchingThread( ):
    This method starts the GUI thread programmatically by posting an event to the system's event queue. The event to post is used to immediately take a reference to the GUI thread upon the event's execution. This method waits until the GUI thread is started and a reference to it has been taken.
  stopEventDispatchingThread( ):
    This method calls an internal method of the system event queue which leads to a normal termination of the queue and the GUI thread. This method returns immediately. joinEventDispatchingThread( ) may be used in order to acknowledge the termination.
ZEventDispatchingThreadWorkerQueue:
  This class extends the normal EventQueue class by means for dispatching custom events. It works together with the ZEventDispatchingThreadController and ZEventDispatchingThreadWorker.
  dispatchEvent(AWTEvent):
    This method overrides the same method of the parent class and adds the ability to dispatch custom events. It simply checks if the event to dispatch is of type ZEventDispatchingThreadWorkerEvent or not. If positive, the event is dispatched via ZEventDispatchingThreadWorker; otherwise, the dispatching is forwarded to the overridden method of the parent class.
ZEventDispatchingThreadWorker:
  This class represents an abstract action the will be executed on the GUI thread. This class is to be attached to a ZEventDispatchingThreadWorkerEvent. This class works with ZEventDispatchingThreadController class.
  doOnEventDispatchingThread( ):
    This is an abstraction method that may be replaced by concrete implementations that wraps code to be executed on the GUI thread.
  setThrowable(Throwable):
    This method can be used to save a reference to potential failure or error encountered during the execution of the code wrapped in doOnEventDispatchingThread( ) The execution terminates when an error or failure occurs, so there is either one error or failure or nothing at all. Throwable is a super class of errors and failures in Java.
  getThrowable( ):
    Gets a reference to a potential failure/error. The method returns a null reference if the doOnEventDispatchingThread( ) has been executed and terminated normally.
ZEventDispatchingThreadWorkerEvent:
  This class extends the normal GUI event type in order to provide a special and distinguishable new event type that will be used to execute workers that wrap code destined to be executed on the GUI thread.
  getWorker( ):
    This method returns a reference to the ZEventDispatchingThreadWorker wrapping the code to execute on the GUI thread.
  execute( ):
    This method executes the code on the GUI thread by calling the doOnEventDispatchingThread( ) method of the ZEventDispatchingThreadWorker class.

The test driver is invoked by a test runner (e.g., JUnit) and is asked to execute a specific test case. The test driver loads the test case data and, just before it starts with the test environment construction but after preparing the mock objects, it starts the EDT.

The EDT is started by a special event that suggests the GUI subsystem is present and available for interaction. Normally, the EDT requires a GUI subsystem responsible for providing the user input as events (e.g., mouse and key events). The main event queue of the EDT is replaced by a custom one that delegates normal GUI events to the standard event queue (the replaced one) and dispatches some special events itself.

The special events include one event for code execution (which in certain example embodiments may be code related to the test logic and test environment reconstruction) and another for shutting down the event queue remotely.

After the EDT is started and its event queue has been replaced, the test environment is constructed while running the construction code on the EDT. It will be appreciated that the test environment construction code is an example of GUI related code that is to be run on the EDT. The assertions evaluation and the custom test logic also may be executed on the EDT. This can be achieved in certain example embodiments by encapsulation of such code in dedicated execution events that can be understood by the custom event queue.

While the EDT is executing its main loop (which may include fetch and dispatch events), the EDT controller monitors the state of the EDT and waits until the latter has no events left to execute. In such a case, the controller sends a shutdown message as a special event to the EDT so that it can terminate appropriately. The controller waits for the termination of the EDT and then terminates itself normally. The test results are collected and returned to the test runner which reports them to the user.

Figure 24:
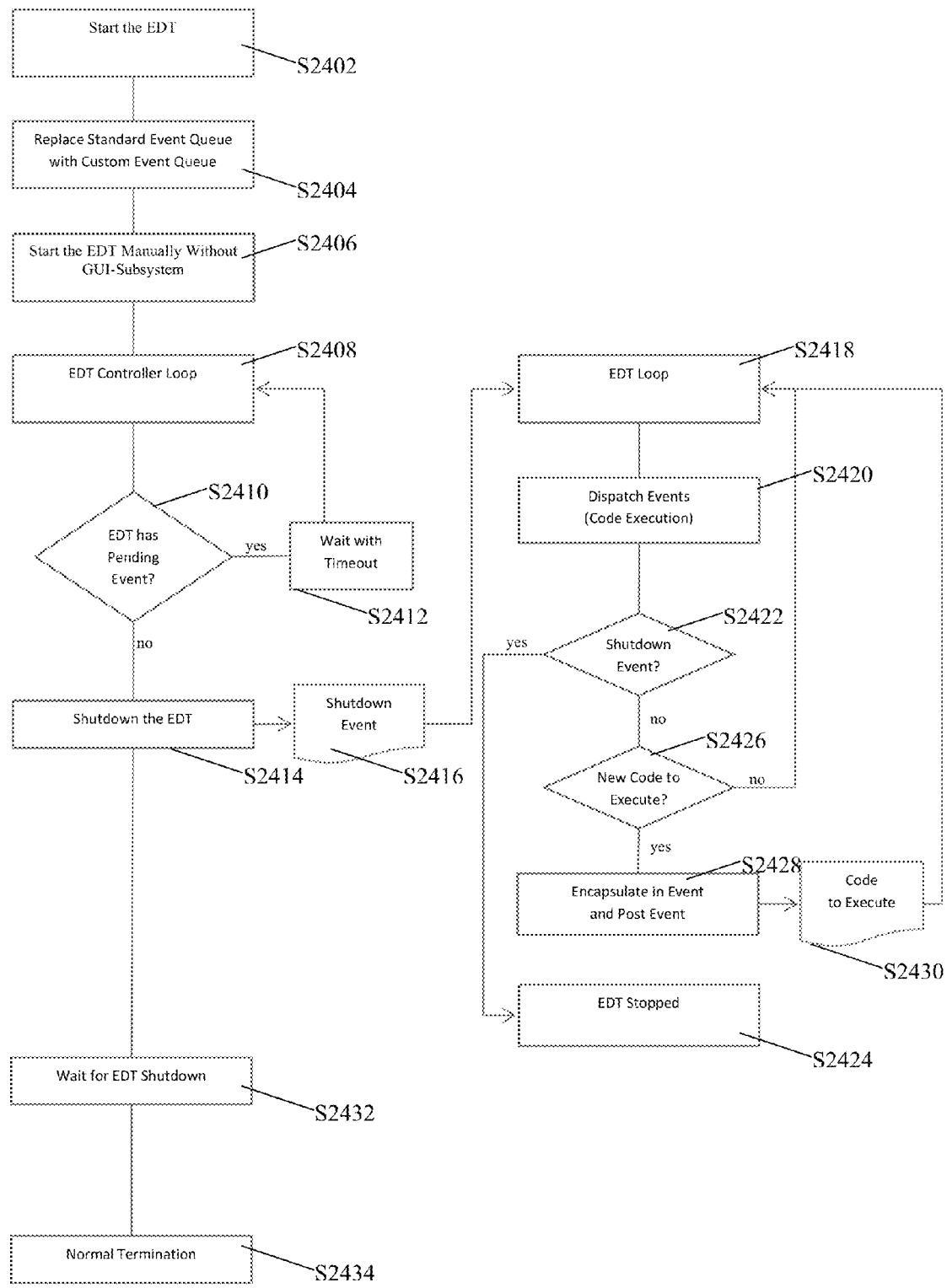
FIG. 24 is a flowchart showing example EDT support techniques of certain example embodiments.

This example approach is described in greater detail in connection with FIG. 24, which is a flowchart showing example EDT support techniques of certain example embodiments. As shown in FIG. 24, the EDT is started in step S2402. The standard event queue is replaced with a custom event queue in step S2404. The EDT may be started manually, e.g., without the GUI subsystem and/or programmatically without involving user input or human assistance. The EDT controller loop then begins operating in step S2408. In parallel, the EDT loop, after being started by the controller, is running as in step S2418. In step S2410, a determination is made as to whether the EDT has any pending events. If so, the process waits in step S2412 a predetermined amount of time, and loops back. As indicated above, the control loops and waits until the EDT has no events left to execute, at which point the process proceeds to step S2414, when the controller sends a shutdown message (step S2416) as a special event to the EDT. In such a case, the EDT loop already running as in step S2418 and executing code in step S2420, receives the special shutdown event and acts accordingly. For example, it checks whether there is a final shutdown event in step S2422, then the EDT is stopped in step S2424, and remote termination takes place.

On the other hand, if the other determination is reached in step S2422, then a determination is made in step S2426 as to whether there is new code to execute. If not, the process loops back to step S2418. However, if there is further code to execute, the code is encapsulated in an event as in step S2430 and the event is posted in step S2428. The code execution takes places in step S2420. The process then loops back to step S2418.

It is noted that after a special shutdown event is sent to the EDT Loop, the system waits for the EDT shutdown in step S2432, and normal termination takes place in step S2434.

Although certain example embodiments have been described in connection with Java and, for example, in connection with its Event Dispatching Thread, it will be appreciated that the example techniques described herein may be used in connection with other programming languages and/or processing environments and are not strictly limited to the Java Event Dispatching Thread and a corresponding Event Dispatching Thread Adapter. For instance, the example techniques described herein may work with an adapter configured to supplement and/or partially or fully supplant any and/or all threads dedicated to the running of the GUI. Thus, certain example embodiments may be said to operate in connection with an adapter configured to execute interactions on the test environment's dedicated GUI thread(s).

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A processor-executed method of testing an application in connection with a test case, the method comprising:
    retrieving the test case to be run on the application, the test case including (a) interactions between the application and components external to the test case's scope that were gathered as the application ran and received user input from a user until a desired test state was reached, and (b) assertions to be made to the application once the application reaches the desired test state;
    setting up a test environment in connection with a test runner, the test environment replacing a normal environment in which the application runs, the test environment including an adapter configured to execute interactions on the test environment's GUI thread;
    feeding the application with interactions included in the test case, through the adapter, until the application reaches the desired test state;
    once the application reaches the desired test state, feeding the application with assertions included in the test case through the adapter;
    comparing expected data associated with the assertions with data actually being generated by the application; and
    determining, from the comparison, whether the test case resulted in a success or failure.

2. The method of claim 1, further comprising:
    sending the comparison to the test runner, the success/failure determination being made by the test runner and reported to the user through a unit tester module connected to the test runner.

3. The method of claim 1, wherein the test case further comprises user-defined test logic to be performed on the application once it reaches the desired test state, and further comprising:
    once the application reaches the desired test state, evaluating the test logic in the application under test;
    further comparing expected results from the test logic with results actually being generated by the application; and including this further comparison in the determination as to whether the test case resulted in a success or failure.

4. The method of claim 1, further comprising, in the setting up of the test environment, initializing mock objects that simulate behaviors of communication layer entities that operate when the application is running in the normal environment.

5. The method of claim 4, wherein during said feeding processes, the adapter is in communication with the mock objects rather than components external to the test case's scope.

6. The method of claim 1, wherein each said interaction includes a message identifier, a message name, a timestamp associated with the interaction, and one or more data fields.

7. The method of claim 6, wherein the interactions are chronologically orderable by virtue of the identifiers associated therewith.

8. The method of claim 1, further comprising attaching a runtime framework to the application, the framework having access to data and classes of the application while the application is running.

9. The method of claim 8, further comprising executing, within the application, test code developed and maintained outside of the application in connection with the framework.

10. The method of claim 8, further comprising:
executing a plurality of test cases on the application; and
deriving test coverage metrics for the test cases, in connection with the framework.

11. A non-transitory computer readable storage medium tangibly storing a program that, when executed by at least one processor of a computer system, implements a method according to claim 1.

12. The method of claim 1, wherein the test case for the application is generated by at least:
starting the application to be tested in the environment in which the application is normally run;
storing, in connection with a recorder attached to the application, interactions between the application and components external to the test case's scope as the application runs and receives user input from a user; and
when a desired test state is reached:
determining which components of the environment in which the application is normally run are currently active;
determining, from a store including a plurality of different assertion sets, which of those assertions sets apply to the currently active components;
feeding corresponding component state data to each said applicable assertion set to generate a corresponding assertion that holds current component state data; and
generating the test case, the test case including the generated assertions and the stored interactions.

13. The method of claim 12, further comprising:
enabling the user to build custom test logic in connection with user input test logic and/or test logic from a custom test logic store and/or a builder module; and
adding the custom test logic to the test case.

14. The method of claim 12, wherein the recorder operates in a distinct layer between the application and the components external to the test case's scope.

15. The method of claim 14, wherein the distinct layer in which the recorder operates is between a communication layer and a layer including the application's classes.

16. A computer system for testing a computer application in connection with a test case, comprising:
processing resources including at least one processor and a memory;
a non-transitory computer readable storage medium storing a plurality of test cases, each said test case including (a) interactions between the application and components external to the test case's scope that were gathered as the application ran and received user input from a user until a desired test state was reached, and (b) assertions to be made to the application once the application reaches the desired test state; and
a test runner configured to cooperate with the processing resources to set up a test environment in connection that replaces a normal environment in which the application runs, the test environment including an adapter configured to execute interactions on the test environment's GUI thread;
wherein, in connection with a selected one of said test cases, the adapter and/or test runner is/are configured to:
feed the application with interactions included in the selected test case until the application reaches the desired test state,
once the application reaches the desired test state, feed the application with assertions included in the selected test case,
compare expected data associated with the assertions with data actually being generated by the application, and
determine, from the comparison, whether the selected test case resulted in a success or failure.

17. The system of claim 16, wherein:
at least one of the test cases further comprises user-defined test logic to be performed on the application once it reaches the desired test state;
the adapter is further configured to facilitate evaluation of test logic from a selected test case in the application under test once the application reaches the desired test state; and
the test runner is further configured to:
further compare expected results from the test logic with results actually being generated by the application; and
include this further comparison in the determination as to whether the test case resulted in a success or failure.

18. The system of claim 16, wherein the test runner is further configured to initialize mock objects that simulate behaviors of communication layer entities that operate when the application is running in the normal environment such that, during said feeding processes, the adapter is in communication with the mock objects rather than components external to the test case's scope.

19. The system of claim 16, wherein each said interaction includes a message identifier, a message name, a timestamp associated with the interaction, and one or more data fields, the interactions being chronologically orderable by virtue of the identifiers associated therewith.

20. The system of claim 16, further comprising a runtime framework attachable to the application, the framework having access to data and classes of the application while the application is running and being configured to execute, within the application, test code developed and maintained outside of the application in connection with the framework.

* * * * *